United States Patent
Arai et al.

(10) Patent No.: US 6,502,543 B1
(45) Date of Patent: Jan. 7, 2003

(54) INTAKE-AIR QUANTITY CONTROL APPARATUS FOR INTERNAL COMBUSTION ENGINES

(75) Inventors: Masahiro Arai, Yokohama (JP); Hatsuo Nagaishi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/830,286
(22) PCT Filed: Nov. 7, 2000
(86) PCT No.: PCT/JP00/07792
§ 371 (c)(1), (2), (4) Date: Apr. 25, 2001
(87) PCT Pub. No.: WO01/40642
PCT Pub. Date: Jun. 7, 2001

(30) Foreign Application Priority Data

Dec. 3, 1999 (JP) .............................. 11-345373
Dec. 6, 1999 (JP) .............................. 11-346133

(51) Int. Cl.[7] .............................................. F02D 13/00
(52) U.S. Cl. ................................. 123/348; 123/406.52
(58) Field of Search ................................. 123/348, 347, 123/406.52

(56) References Cited

U.S. PATENT DOCUMENTS

| | | | | |
|---|---|---|---|---|
| 5,339,784 A | * | 8/1994 | Fukui .................... | 123/406.52 |
| 6,039,026 A | | 3/2000 | Shiraishi et al. ......... | 123/399 |
| 6,098,591 A | * | 8/2000 | Iwata .................... | 123/406.52 |
| 6,397,814 B1 | * | 6/2002 | Nagaishi et al. ........ | 123/348 |

FOREIGN PATENT DOCUMENTS

| | | |
|---|---|---|
| DE | 198 47 851 | 4/1999 |
| EP | 0 953 750 | 11/1999 |
| JP | 5-71370 | 3/1993 |
| JP | 8-200025 | 8/1996 |
| JP | 11-311135 | 11/1999 |

* cited by examiner

Primary Examiner—Paul J. Hirsch
(74) Attorney, Agent, or Firm—Foley & Lardner

(57) ABSTRACT

In an intake-air quantity control apparatus for an internal combustion engine equipped with a variable valve timing system associated with at least an intake valve, a throttle valve located upstream of the intake valve, a throttle actuator variably adjusting a throttle opening of the throttle valve, sensors detecting engine operating conditions, an electronic control unit is connected electrically to the sensors, the variable valve timing system, and the throttle actuator, for automatically controlling an intake-air quantity of air entering the engine depending on the engine operating conditions. The control unit calculates a desired intake-air quantity based on the engine operating conditions, and calculates a threshold limit value that corresponds to a lower limit intake-air quantity above which valve timing control of the intake valve enables the intake-air quantity to be brought closer to the desired intake-air quantity. The control unit calculates a first intake valve timing corresponding to the desired intake-air quantity, and calculates a second intake valve timing substantially corresponding to the threshold limit value. The control units sets a desired valve timing of the intake valve to the second intake valve timing and estimates a desired throttle opening that realizes the desired intake-air quantity by throttle opening control of the throttle valve, when the desired intake-air quantity is below the threshold limit value.

25 Claims, 12 Drawing Sheets

INTAKE-AIR QUANTITY CONTROL APPARATUS FOR INTERNAL COMBUSTION ENGINES

BACKGROUND OF THE INVENTION

The present invention relates to the improvements of an intake-air quantity control apparatus for an internal combustion engine equipped with a variable valve timing system which electronically arbitrarily controls a quantity of intake air drawn into the engine closer to a desired value by way of valve timing control.

In recent years, there have been proposed and developed various electronically-controlled variable valve timing systems which can operate intake and exhaust valves electromagnetically or hydraulically to adjust an intake-air quantity by way of -valve timing control. One such electronically-controlled variable valve timing system having electromagnetically-driven valve units has been disclosed in Japanese Patent Provisional Publication Nos. 8-200025 and 11-311135. In the Japanese Patent Provisional Publication Nos. 8-200025 and 11-311135, engine valves are electronically controlled by means of an electromagnetic solenoid valve controller, instead of a typical cam-drive mechanism. On the other hand, an electronically-controlled, hydraulically-operated variable valve timing system has been disclosed in Japanese Patent Provisional Publication No. 5-71370. In case of the aforementioned electromagnetically-operated engine valve, the engine valve is electronically arbitrarily controlled by means of the electromagnetic valve controller and thus the valve timing can be controlled continuously over a very wide range. Generally, such an electromagnetically-powered engine valve includes a pair of electromagnetic coils respectively attracting an engine valve when the pair of electromagnetic coils are energized, and a pair of return springs biasing the engine valve respectively in a direction opening and closing of the engine valve. When an electromagnetically-powered valve is applied to an intake valve, it is possible to control a quantity of intake air while introducing intake air of a substantially atmospheric pressure level into the engine cylinder, by advancing an intake valve closure timing. By way of the intake-valve-closure-timing (IVC) advancement control, a pumping loss can be reduced, thus improving fuel economy.

SUMMARY OF THE INVENTION

However, in case of an electromagnetically-powered intake valve, there is a problem of a limited driving speed of the electromagnetically-driven intake valve. That is to say, in the case that the intake valve is driven by way of an electromagnetic force, the driving speed of the intake valve is generally kept at a specified speed regardless of engine speeds. The specified speed is determined depending on both the spring stiffness of each spring and the magnitude of inertial mass of movable component parts of the electromagnetically-powered valve operating device. Owing to the previously-noted limitation on driving speed, an engine operating range in which an actual intake-air quantity cannot be brought closer to a desired value by only the intake valve closure timing control, exists. When changing from one of an intake valve closed state and an intake valve open state to the other, the electromagnetically-powered valve operating device requires a specified operating time, regardless of engine speeds. In other words, the minimum operating time of the electromagnetically-powered valve operating device is also limited. For the reasons set forth above, the minimum working angle of the intake valve tends to become greater at high engine speeds. Therefore, it is difficult to bring the actual intake-air quantity closer to the desired value by way of only the valve timing control made to the electromagnetically-driven intake valve, in a high-speed, low-load operating range in which a desired intake-air quantity is comparatively small.

Accordingly, it is an object of the invention to provide an intake-air quantity control apparatus for an internal combustion engine, which avoids the aforementioned disadvantages.

It is another object of the invention to provide an intake-air quantity control apparatus for an internal combustion engine, which can control an intake-air quantity over a wide operating range by way of valve timing control of an electromagnetically-driven intake valve, irrespective of a limited driving speed of the intake valve, that is, limitations in the valve timing control.

It is a further object of the invention to provide an intake-air quantity control apparatus for an internal combustion engine, which can ensure smooth switching operation without any torque difference during switching between an operating range in which an actual intake-air quantity can be controlled closer to a desired value by valve timing control and an operating range in which the actual intake-air quantity cannot be controlled closer to the desired value by only the valve timing control.

It is a still further object of the invention to provide an intake-air quantity control apparatus for an internal combustion engine, which can maximize an IVC advancement control area in which a quantity of intake air can be controlled while introducing intake air of a substantially atmospheric pressure level into the engine cylinder, by advancing an intake valve closure timing, thus ensuring a reduced pumping loss and improved fuel economy.

In order to accomplish the aforementioned and other objects of the present invention, an intake-air quantity control apparatus for an internal combustion engine comprises a variable valve timing system associated with at least an intake valve, a throttle valve located upstream of the intake valve, a throttle actuator variably adjusting a throttle opening of the throttle valve, sensors detecting engine operating conditions, and a control unit configured to be connected electrically to the sensors, the variable valve timing system, and the throttle actuator, for automatically controlling an intake-air quantity of air entering the engine depending on the engine operating conditions, the control unit comprising a data processing section programmed to perform the following, calculating a desired intake-air quantity based on the engine operating conditions, calculating a first intake valve timing corresponding to the desired intake-air quantity, determining, responsively to the engine operating conditions, whether the desired intake-air quantity is below a threshold limit value that corresponds to a lower limit intake-air quantity above which valve timing control of the intake valve enables the intake-air quantity of the engine to be brought closer to the desired intake-air quantity, calculating a second intake valve timing substantially corresponding to the threshold limit value, setting a desired valve timing of the intake valve to the second intake valve timing when the desired intake-air quantity is below the threshold limit value, and calculating a desired throttle opening that realizes the desired intake-air quantity by throttle opening control of the throttle valve when the desired intake-air quantity is below the threshold limit value.

According to another aspect of the invention, an intake-air quantity control apparatus for an internal combustion engine comprises a variable valve timing system associated with at least an intake valve, a throttle valve located upstream of the intake valve, a throttle actuator variably adjusting a throttle opening of the throttle valve, sensors detecting engine operating conditions, and a control unit configured to be connected electrically to the sensors, the variable valve timing system, and the throttle actuator, for automatically controlling an intake-air quantity of air entering the engine depending on the engine operating conditions, the control unit calculating a desired intake-air quantity based on the engine operating conditions, and performing a first operating mode when the desired intake-air quantity is above a threshold limit value that corresponds to a lower limit intake-air quantity above which valve timing control of the intake valve enables the intake-air quantity of the engine to be brought closer to the desired intake-air quantity, and performing a second operating mode when the desired intake-air quantity is below the threshold limit value, the first operating mode in which the intake-air quantity of the engine is brought closer to the desired intake-air quantity by the valve timing control of the intake valve and a throttle opening area of the throttle valve decreases with a decrease in the desired intake-air quantity to realize a desired boost, and the second operating mode in which the intake-air quantity is brought closer to the desired intake-air quantity by reducing the throttle opening area of the throttle valve to below the throttle opening area of the first operating mode that realizes the desired boost.

According to a further aspect of the invention, an intake-air quantity control apparatus for an internal combustion engine comprises a variable valve timing system associated with at least an intake valve, a throttle valve located upstream of the intake valve, a throttle actuator variably adjusting a throttle opening of the throttle valve, sensors detecting engine operating conditions including at least engine speed, and a control unit configured to be connected electrically to the sensors, the variable valve timing system, and the throttle actuator, for automatically controlling an intake-air quantity of air entering the engine depending on the engine operating conditions, the control unit calculating a desired intake-air quantity based on the engine operating conditions, and calculating a threshold limit value that corresponds to a lower limit intake-air quantity above which intake valve closure timing control of the intake valve enables the intake-air quantity of the engine to be brought closer to the desired intake-air quantity, and variably controlling an intake valve closure timing responsively to the desired intake-air quantity so that the intake-air quantity is brought closer to the desired intake-air quantity by the intake valve closure timing control and decreasingly compensating for a desired throttle opening of the throttle valve with a decrease in the desired intake-air quantity in accordance with a first characteristic to attain a desired boost in a first operating range in which the desired intake-air quantity is above the threshold limit value, and variably controlling the intake valve closure timing toward a valve timing corresponding to a minimum working angle which is preprogrammed to be suitable for the engine speed and decreasingly compensating for the desired throttle opening with a decrease in the desired intake-air quantity in accordance with a second characteristic in a second operating range in which the desired intake-air quantity is below the threshold limit value, the first characteristic being a monotonic function according to which the desired throttle opening decreases with a decrease in the desired intake-air quantity, and the second characteristic being a predetermined characteristic curve according to which points lying on the predetermined characteristic curve are lower than points lying on the first characteristic within the second operating range.

According to a still further aspect of the invention, an intake-air quantity control apparatus for an internal combustion engine comprises a variable valve timing system associated with at least an intake valve, a throttle valve located upstream of the intake valve, a throttle actuator variably adjusting a throttle opening of the throttle valve, sensors detecting engine operating conditions including at least engine speed, and a control unit configured to be connected electrically to the sensors, the variable valve timing system, and the throttle actuator, for automatically controlling an intake-air quantity of air entering the engine depending on the engine operating conditions, and calculating a desired intake-air quantity based on the engine operating conditions and calculating a threshold limit value that corresponds to a lower limit intake-air quantity above which intake valve closure timing control of the intake valve enables the intake-air quantity of the engine to be brought closer to the desired intake-air quantity, the control unit comprising an intake-valve closure timing control means connected to the variable valve timing control system for variably controlling an intake valve closure timing responsively to the desired intake-air quantity so that the intake-air quantity is brought closer to the desired intake-air quantity by the intake valve closure timing control in a first operating range in which the desired intake-air quantity is above the threshold limit value, and for variably controlling the intake valve closure timing toward a valve timing corresponding to a minimum working angle which is preprogrammed to be suitable for the engine speed in a second operating range in which the desired intake-air quantity is above the threshold limit value, and a throttle control means connected to the throttle actuator for decreasingly compensating for a desired throttle opening of the throttle valve with a decrease in the desired intake-air quantity in accordance with a first characteristic to attain a desired boost in the first operating range, and for decreasingly compensating for the desired throttle opening with a decrease in the desired intake-air quantity in accordance with a second characteristic in the second operating range, the first characteristic being a monotonic function according to which the desired throttle opening decreases with a decrease in the desired intake-air quantity, and the second characteristic being a predetermined characteristic curve according to which points lying on the predetermined characteristic curve are lower than points lying on the first characteristic within the second operating range.

According to another aspect of the invention, an electronic control method for an internal combustion engine comprising a variable valve timing system associated with at least an intake valve, a throttle valve located upstream of the intake valve, a throttle actuator variably adjusting a throttle opening of the throttle valve, and sensors detecting engine operating conditions including at least engine speed, the electronic control method comprises calculating a desired intake-air quantity based on the engine operating conditions, calculating a threshold limit value that corresponds to a lower limit intake-air quantity above which intake valve closure timing control of the intake valve enables an intake-air quantity of air entering the engine to be brought closer to the desired intake-air quantity, comparing the desired intake-air quantity to the threshold limit value, retrieving an intake valve closure timing from a first desired intake-air quantity versus intake valve closure timing characteristic according to which the intake-air quantity is brought closer to the desired intake-air quantity by the intake valve closure timing control in a first operating range in which the desired intake-air quantity is above the threshold limit value, retrieving the intake valve closure timing from a second engine speed versus intake valve closure timing characteristic according to which the intake valve closure timing is set at a valve timing corresponding to a minimum working angle which is preprogrammed to be suitable for the engine speed in a second operating range in which the desired intake-air quantity is below the threshold limit value, decreasingly compensating for a desired throttle opening of the throttle valve with a decrease in the desired intake-air quantity in accordance with a first desired intake-air quantity versus throttle opening area characteristic to attain a desired boost in the first operating range, the first desired intake-air quantity versus throttle opening area characteristic being a monotonic function according to which the desired throttle opening decreases with a decrease in the desired intake-air quantity, and decreasingly compensating for the desired throttle opening with a decrease in the desired intake-air quantity in accordance with a second desired intake-air quantity versus throttle opening area characteristic in the second operating range, the second characteristic being a predetermined characteristic curve according to which points lying on the predetermined characteristic curve are lower than points lying on the first desired intake-air quantity versus throttle opening area characteristic within the second operating range.

DESCRIPTION OF THE PREFERRED EMBODIMENTS

Figure 1:
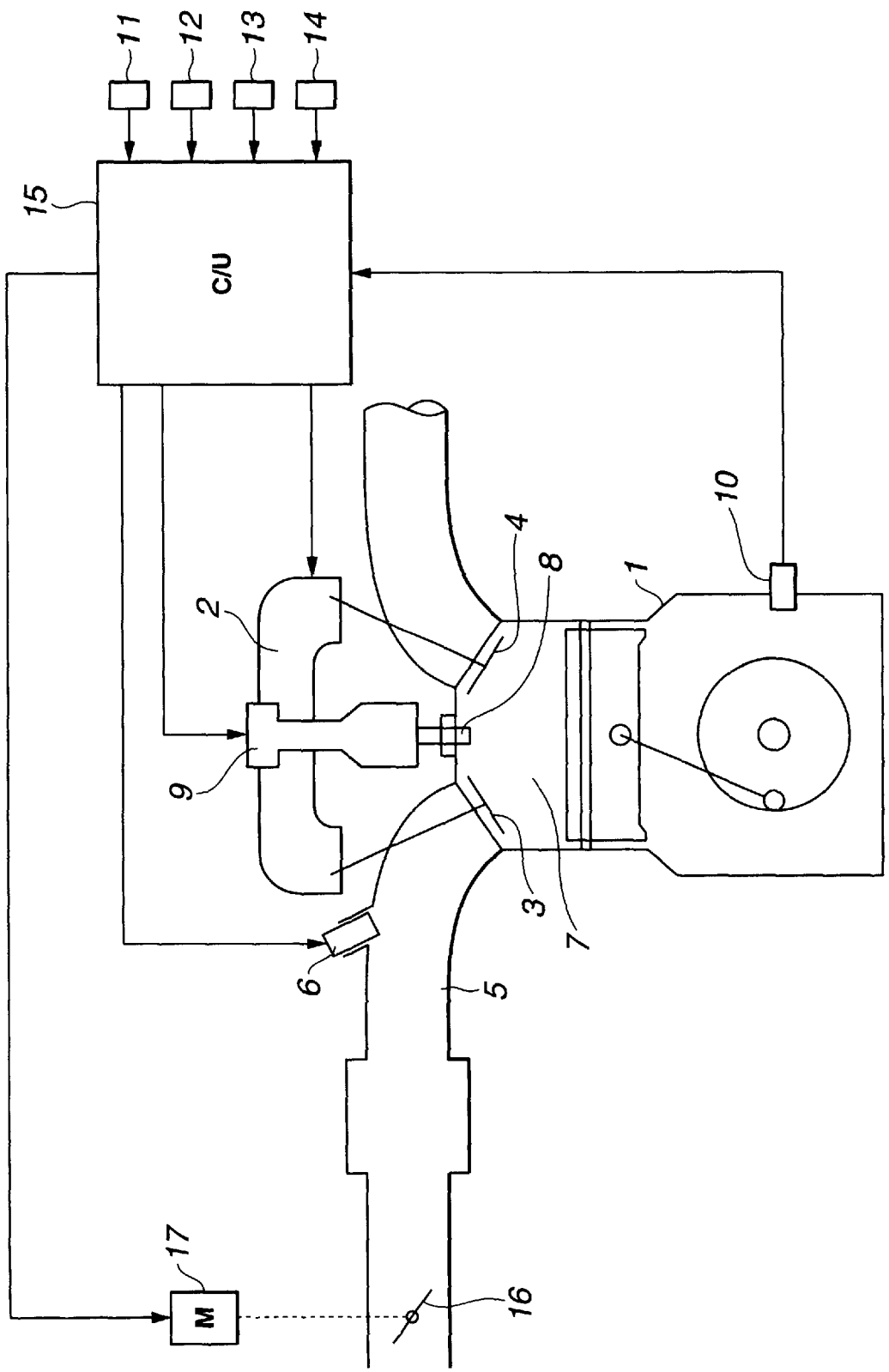
FIG. 1 is a system diagram of an internal combustion engine showing the general intake-air quantity control system component layout.

Referring now to the drawings, particularly to FIG. 1, the intake-air quantity control apparatus of the invention is exemplified in a four-cycle, spark-ignition internal combustion gasoline engine 1 for use in an automotive vehicle. As shown in FIG. 1, a cylinder head of the internal combustion engine 1 is formed with an intake port 5 communicating an intake passage (an intake manifold or an intake-air duct), and an exhaust port (not numbered) communicating an exhaust manifold (not numbered). An electromagnetically-powered intake valve 3 is located in the cylinder head of engine 1 for opening and closing the intake port, whereas an electromagnetically-powered exhaust valve 4 is located in the cylinder head for opening and closing the exhaust port. An intake valve closure timing, often abbreviated to "IVC", an intake valve open timing, often abbreviated to "IVO", an exhaust valve closure timing, often abbreviated to "EVC", and an exhaust valve open timing, often abbreviated to "EVO" are controlled electronically by means of an electromagnetic valve operating mechanism 2 included in a variable valve timing control system. A fuel injector 6 is located within the intake port 5. A spark plug 8 is screwed into a tapped hole of the cylinder head for each combustion chamber 7 to ignite the air fuel mixture in the combustion chamber. Reference sign 9 denotes an ignition coil located for each spark plug 8, to produce a spark at the spark-plug gap. A crank angle sensor (or a crankshaft sensor) 10 is bolted to a cylinder block of engine 1 for monitoring engine speed Ne as well as a relative position of the engine crankshaft. Actually, crank angle sensor 10 outputs a reference signal at a reference piston stroke position of each individual engine cylinder, and to generate a unit crank angle signal for every unit crank angles. Although it is not clearly shown in FIG. 1, an airflow meter 11 is located on the intake-air duct for detecting a quantity of air flowing through the airflow meter and drawn into the engine. A hot-wire mass air flow meter is commonly used as the air quantity sensor. Reference sign 12 denotes an engine temperature sensor. A coolant temperature sensor is usually used as the engine temperature sensor. The coolant temperature sensor is mounted on the engine and usually screwed into one of top coolant passages to sense the actual operating temperature of the engine. An accelerator opening sensor 13 is located near the accelerator for monitoring an opening APO of the accelerator (the amount of depression of the accelerator pedal). A vehicle speed sensor 14 is usually located at either the transmission or transaxle for monitoring the output shaft speed to the road wheels. The output shaft speed is relayed as a pulsing voltage signal to the input interface of an electronic control unit (ECU) 15 and converted into the vehicle speed data. The operating parameters detected by the previously-noted engine/vehicle sensors are used to electronically control an ignition timing of an electronic ignition system containing spark plugs 8 and ignition coils 9, an injection amount as well as a fuel-injection timing of each injector 6 included in an electronic fuel-injection system, a throttle opening of an electronically-controlled throttle valve 16 (which will be fully described later), the intake valve closure timing (IVC) of each intake valve 3, the intake valve open timing (IVO), the exhaust valve open timing (EVO) of each exhaust valve 4, and the exhaust valve closure timing (EVC). Throttle valve 16 is provided upstream of intake port 5 and located between airflow meter 11 and a collector (not numbered) of the induction system. Throttle valve 16 is opened and closed by means of a throttle actuator 17. A stepping motor is usually used as the throttle actuator.

Figure 2:
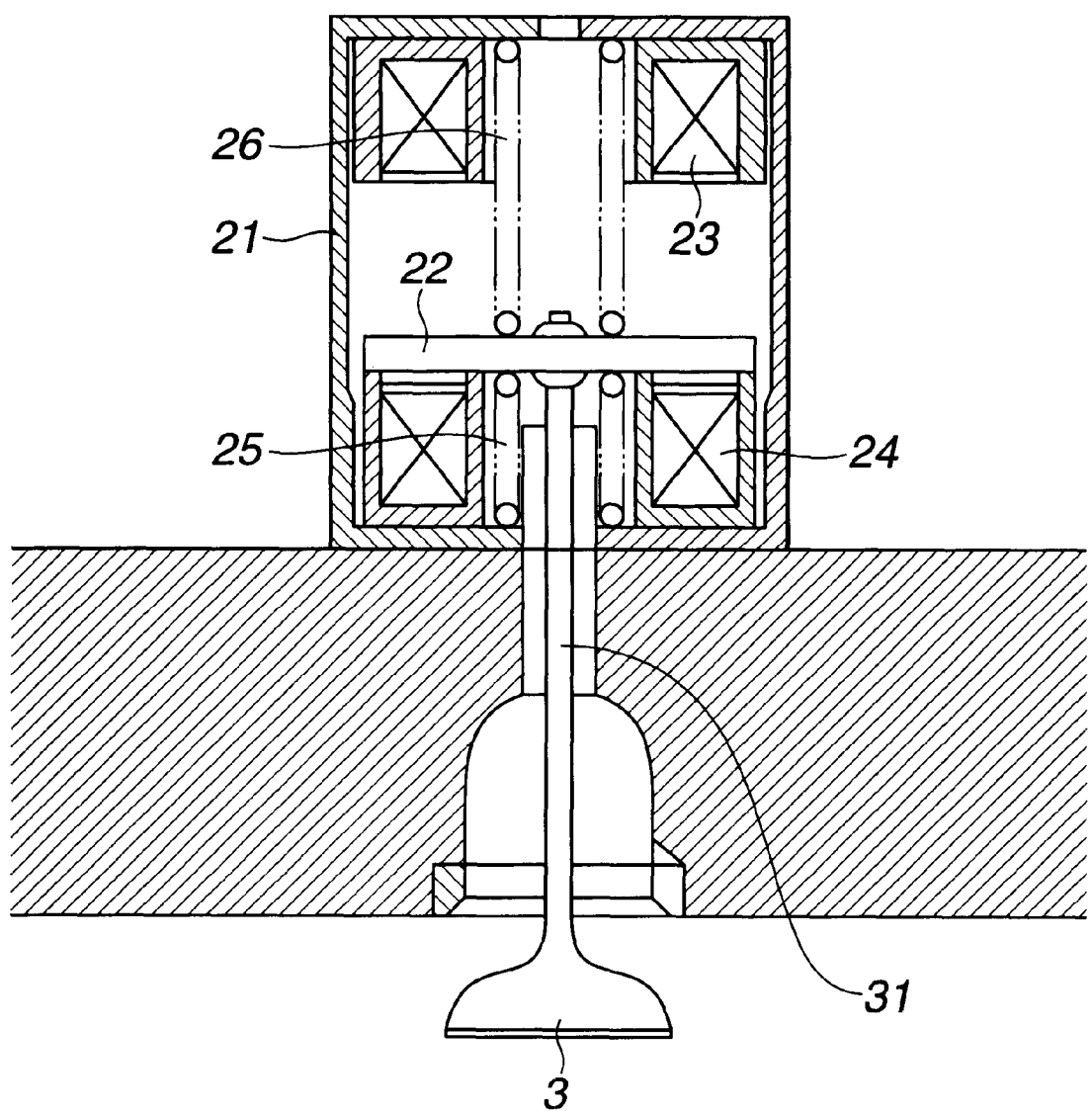
FIG. 2 is a longitudinal cross sectional view showing the general electromagnetic valve operating mechanism.

Referring now to FIG. 2, there is shown a detailed structure of electromagnetic valve operating mechanism 2. For the sake of illustrative simplicity, the electromagnetically-driven intake valve for only one engine cylinder is shown, because the basic structure is the same in each engine valve containing the exhaust valve. As shown in FIG. 2, electromagnetic valve operating mechanism 2 is comprised of a non-magnetic housing 21, a disc-shaped armature 22, a valve-closing electromagnet (or a valve-closing electromagnetic coil) 23, a-valve-opening electromagnet (or a valve-opening electromagnetic coil) 24, a valve-closing return spring 25, and a valve-opening return spring 26. Non-magnetic housing 21 is installed on the cylinder head. Armature 22 is integrally connected to a stem 31 of intake valve 3 so that the armature is movable within the housing. Electromagnet (electromagnetic coil) 23 faces the upper surface of armature 22, so that electromagnet 23 attracts the armature in a direction closing the intake valve when electromagnet 23 is energized. Electromagnet (or a valve-opening electromagnetic coil) 24 faces the lower surface of armature 22, so that electromagnet 24 attracts the armature in a direction opening the intake valve when electromagnet 24 is energized. Return spring 25 biases the intake valve (the armature) in the valve-closing direction, whereas return spring 26 biases the intake valve (the armature) in the valve-opening direction. Spring stiffness of return spring 25 and spring stiffness of return spring 26 are designed so that intake valve 3 is kept at a substantially half-open position (substantially midway between a full-open position and a fully-closed position) when electromagnets 23 and 24 are both de-energized. When only the valve-closing electromagnet 23 is energized, intake valve 3 is fully closed. Conversely, when only the valve-opening electromagnet 24 is energized, intake valve 3 is fully opened. With the previously-noted arrangement, the intake valve closure timing (IVC), the intake valve open timing (IVO), the exhaust valve closure timing (EVC), and the exhaust valve open timing (EVO) are controlled or brought closer to their desired values which are determined depending upon engine operating conditions based on input informational signals from the previously-noted engine/vehicle sensors. The valve timing control system incorporated in the control apparatus of the embodiment is designed, so that the intake valve closure timing IVC of intake valve 3 can be variably controlled in a timing advancement direction on the basis of a desired intake-air quantity which is determined based on accelerator opening APO and engine speed Ne, and whereby the intake-air quantity for every engine cylinder can be variably controlled. The aforementioned desired intake-air quantity corresponds to a desired value of a volumetric flow rate which is represented as a volume of fresh air under a standard condition (standard temperature and pressure) with respect to a stroke volume. The previously-discussed IVC advancement control according to which the intake valve closure timing (IVC) is controlled to a timing point before BDC on the intake stroke, can be named "IVC advancement Miller-cycle operating mode".

Figure 3:
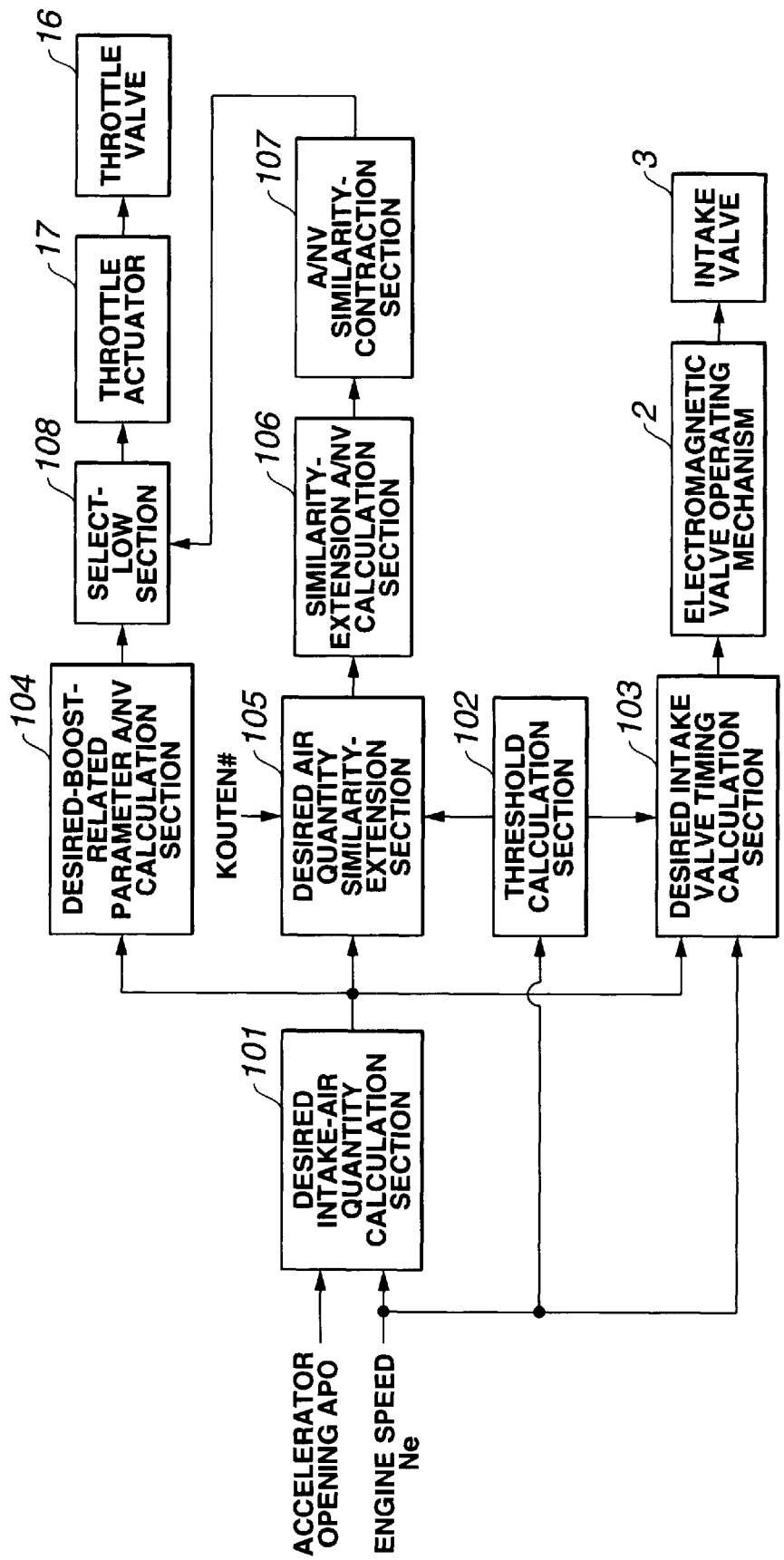
FIG. 3 is a detailed block diagram of one embodiment of the intake-air quantity control apparatus of the invention.

Referring now to FIG.3, there is shown the intake-air quantity control system block diagram of control unit 15 of the intake-air quantity control apparatus of the first embodiment.

Figure 4:
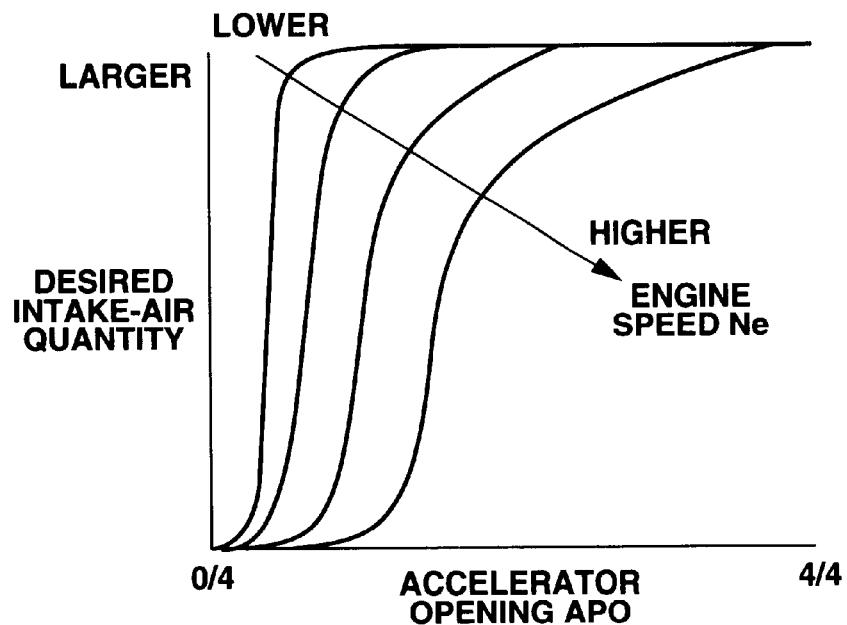
FIG. 4 is a predetermined characteristic map showing the relationship of accelerator opening (APO) versus desired intake-air quantity at various engine speeds (Ne).
Figure 6:
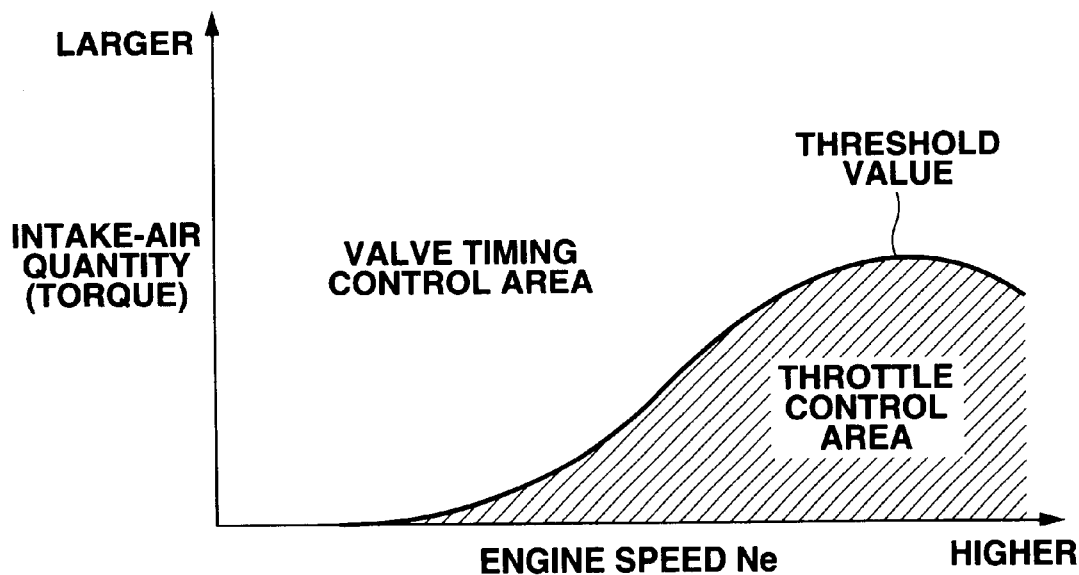
FIG. 6 is a predetermined line map illustrating intake-air quantity control characteristics stored in the control apparatus of the embodiments of FIGS. 3 and 13.

Within ECU 15, first, a desired intake-air quantity calculation section 101 receives input signals APO and Ne from both accelerator opening sensor 13 and crank angle sensor 10, and then calculates a desired intake-air quantity (exactly, a desired engine-cylinder intake-air quantity which can be regarded as a desired torque) based on accelerator opening APO (regarded as engine load) and engine speed Ne. Concretely, the desired intake-air quantity is retrieved from a predetermined or preprogrammed characteristic map showing how a desired intake-air quantity varies relative to accelerator opening APO and engine speed Ne (see FIG. 4). In the shown embodiment, although the desired intake-air quantity is map-retrieved based on both accelerator opening APO and engine speed Ne, it is more preferable to arithmetically calculate or compute a final desired intake-air quantity, taking account of an idle-holding air quantity corresponding to a required air quantity needed to hold an engine idling operation, in addition to accelerator opening APO and engine speed Ne. In this case, the final desired intake-air quantity can be calculated by adding the idle-holding air quantity to the desired intake-air quantity based on accelerator opening APO and engine speed Ne. A threshold calculation section 102 arithmetically calculates a threshold limit value (a threshold value) based on the engine operating conditions (engine load and engine speed), in particular engine speed Ne. The threshold value corresponds to a lower limit intake-air quantity above which the IVC control enables the actual intake-air quantity to be brought closer to the desired intake-air quantity and below which the actual intake-air quantity can be brought closer to the desired intake-air quantity by the aid of throttle opening control (described later). In other words, as described hereunder in detail, when the desired intake-air quantity is below the threshold value (lower limit intake-air quantity), the intake-air quantity cannot be satisfactorily controlled by way of only the valve timing control (IVC control), due to a minimum limited operating time of the electromagnetically-powered intake valve. As discussed above, the minimum operating time of intake valve 3 is limited and thus the minimum working angle of intake valve 3 tends to become larger in a high engine-speed range. Such a high-speed, low-load operating range (see the hatched area of FIG. 6) corresponds to an operating range in which the actual intake-air quantity cannot be controlled closer to the desired value (desired engine torque) by way of only the previously-described IVC advancement control (IVC advancement Miller-cycle operating mode). As can be seen in FIG. 6, there are two different engine operating ranges, namely an upper unhatched operating range of FIG. 6 in which the actual intake-air quantity is controlled closer to the desired value by way of the valve timing control (IVC advancement Miller-cycle operating mode), and a lower hatched operating range of FIG. 6 in which the actual intake-air quantity is not controlled closer to the desired value by way of only the valve timing control (IVC advancement Miller-cycle operating mode). As detailed hereunder, the upper unhatched operating range of FIG. 6 will be hereinafter referred to as a "valve timing control area", whereas the lower hatched operating range of FIG. 6 will be hereinafter referred to as a "throttle control area". In FIG. 6, the borderline between the valve timing control area and the throttle control area corresponds to the previously-noted threshold value (lower limit intake-air quantity). That is to say, in case of electromagnetic valve operating mechanism 2, the driving speed of intake valve 3 is held at a specified speed regardless of engine speeds, and thus a specified minimum valve operating time is required. As discussed above, in the high-speed operating range, the minimum working angle of intake valve 3 from intake valve open timing IVO to intake valve closure timing IVC tends to become greater. In other words, the intake valve closure timing tends to be retarded in terms of crank angle, with an increase in engine speed. For the reasons set forth above, the intake-air quantity obtained when intake valve 3 is opened in close proximity to its minimum operating time by means of electromagnetic valve operating mechanism 2 with the throttle valve held at a substantially full-open position, that is, the previously-noted threshold value (the lower limit intake-air quantity corresponding to the borderline between the valve timing control area and the throttle control area shown in FIG. 6) tends to become higher during high engine revolutions. Therefore, the operating range in which the actual intake-air quantity cannot be controlled or decreased closer to the desired value by driving intake valve 3 in close proximity to the minimum operating time, exists in the high-speed range. Therefore, in the shown embodiment, the operating range in which the actual intake-air quantity is controlled closer to the desired value by way of valve timing control was named "valve timing control area". On the other hand, the other operating range in which the actual intake-air quantity is not controlled closer to the desired value by way of only the valve timing control, but controlled closer to the desired value by virtue of throttle opening control was named "throttle control area".

Figure 15:
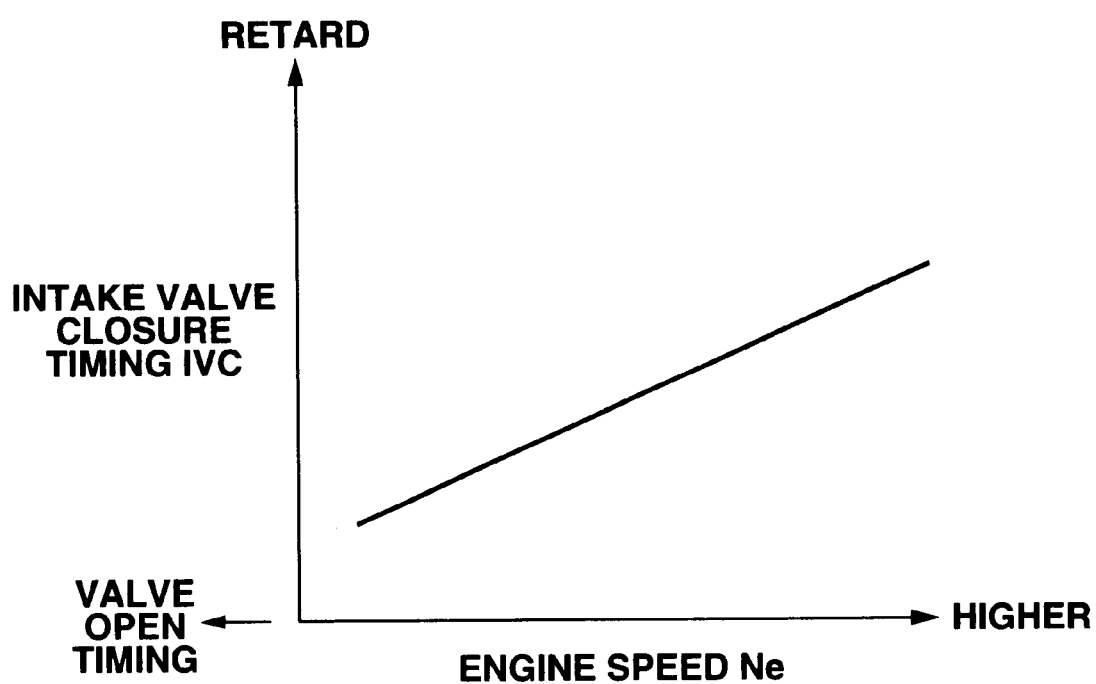
FIG. 15 is a predetermined lookup table showing the relationship of engine speed (Ne) versus intake-valve closure timing (IVC) in the throttle control area.

Returning to the block diagram of FIG. 3, a desired intake valve timing calculation section 103 receives input information from both threshold calculation section 102 and desired intake-air quantity calculation section 101, and receives engine speed data Ne from the crank angle sensor. Desired intake valve timing calculation section 103 compares the threshold value with the desired intake-air quantity to determine whether the current operating range is within the valve timing control area or within the throttle control area. When the desired intake-air quantity is above the threshold value (see the upper unhatched area of FIG. 6) and thus the current operating range is within the valve timing control area, desired intake valve timing calculation section 103 map-retrieves a desired intake valve closure timing based on the desired intake-air quantity (obtained through section 101) from a preprogrammed characteristic map showing how a desired intake valve closure timing (IVC) varies relative to a desired intake-air quantity (see FIG. 5). Conversely, when the desired intake-air quantity is below the threshold value (see the hatched area of FIG. 6) and thus the current operating range is within the throttle control area, in order for intake valve 3 to be driven at the specified minimum operating time, desired intake valve timing calculation section 103 sets or determines the desired intake valve closure timing corresponding to the specified minimum operating time on the basis of the latest up-to-date engine speed data Ne. In the system of the shown embodiment, the desired intake valve closure timing is map-retrieved from the preprogrammed engine speed Ne versus intake valve closure timing IVC characteristic map of FIG. 15. That is, within the throttle control area, the desired intake valve closure timing IVC is set at a timing point corresponding to the minimum working angle for the latest up-to-date engine speed data Ne read at the current control cycle, so that a valve open period from intake valve open timing to intake valve closure timing becomes the specified operating time. In the shown embodiment, as seen from the predetermined engine speed Ne versus intake valve closure timing IVC characteristic of FIG. 15 is a monotonic function that the IVC increases with an increase in the engine speed Ne. As shown in FIG. 3, the output terminal of desired intake valve timing calculation section 103 is connected electrically to electromagnetic valve operating mechanism 2 to generate a control signal corresponding to the desired intake valve closure timing to electromagnetic valve operating mechanism 2 so as to electromagnetically drive intake valve 3 at the desired intake valve closure timing calculated. In this manner, during the throttle opening control (or within the throttle control area), the intake valve can be driven at a substantially minimum working angle for each engine speed. On the other hand, in the control apparatus of the embodiment, the valve open timing (IVO) of intake valve 3 is fixed to a valve timing substantially corresponding to a substantially top dead center (TDC) during exhaust stroke.

Figure 8:
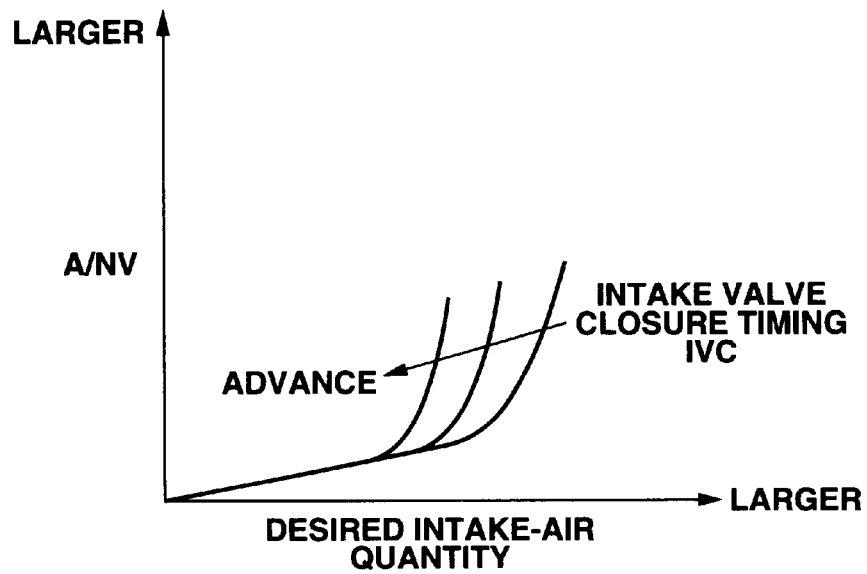
FIG. 8 shows characteristic curves illustrating the correlative relation between the variable parameter A/NV and the desired intake-air quantity for every intake valve closure timing (IVC).
Figure 9:
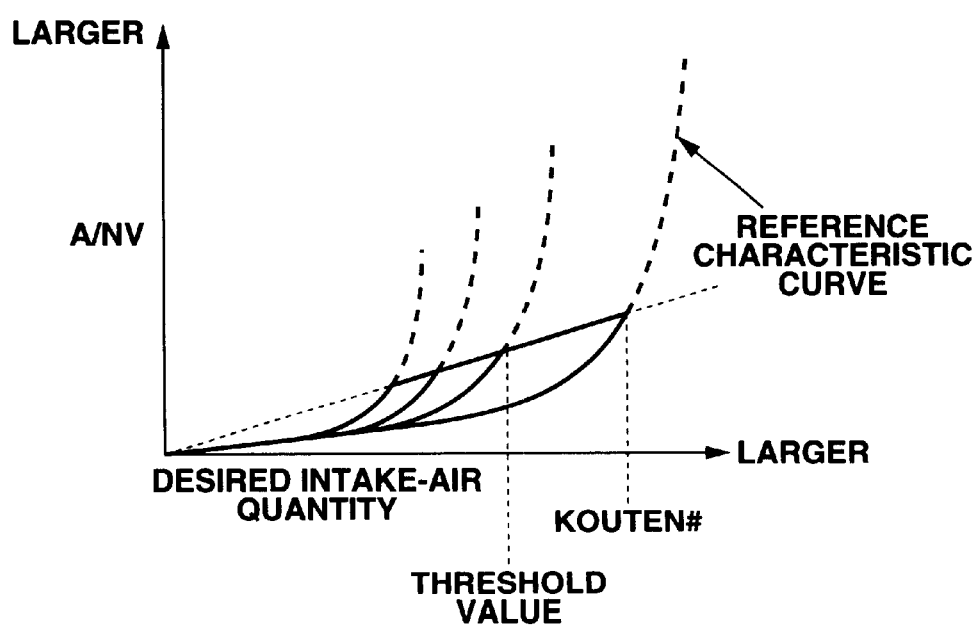
FIG. 9 shows desired intake-air quantity versus A/NV characteristic curves containing a predetermined reference characteristic curve (corresponding to latest IVC) and related to blocks 105–107 of FIG. 3.

A desired-boost-related throttle-opening-area indicative variable parameter A/NV calculation section (simply, desired-boost-related parameter A/NV calculation section) 104 arithmetically calculates or retrieves a desired-boost-related throttle valve opening area indicative variable parameter A/NV (simply, a first parameter A/NV) based on the desired intake-air quantity. The first parameter A/NV corresponds to a value which is obtained by dividing an opening area A of throttle valve 16 by the product (Ne·V) of engine speed Ne and a displacement V of the engine. Actually, the first parameter A/NV is computed or retrieved from a predetermined lookup table showing how a desired-boost-related throttle-opening-area indicative variable parameter A/NV varies relative to a desired intake-air quantity (see FIG. 7). That is, the first parameter A/NV corresponds to a target value needed to control a boost pressure level to a desired boost (or a specified boost) in the previously-discussed valve timing control area in which the actual intake-air quantity can be closer to the desired intake-air quantity (desired value) by way of only the valve timing control. As can be seen from the lookup table shown in FIG. 7, the desired intake-air quantity versus desired-boost-related throttle-opening-area indicative variable parameter A/NV characteristic diagram is set or determined as a monotonic function (a monotone increasing function) according to which a first parameter A/NV is monotone-increased with an increase in the desired intake-air quantity. In other words, the first parameter A/NV is decreased with a decrease in the desired intake-air quantity. The previously-noted desired boost is predetermined or preset to ensure a specified negative pressure (a specified boost) needed to supply purge air from a canister to the engine during purging in which the trapped fuel vapor from the canister is cleared or removed. On the other hand, a desired air quantity similarity-extension section 105 functions to convert or similarity-transform the desired intake-air quantity into a value needed to compute or retrieve a parameter A/NV based on both the threshold value and a pre-stored reference air quantity KOUTEN#, from a preprogrammed desired intake-air quantity versus parameter A/NV reference characteristic (see FIG. 9) corresponding to a reference valve timing (that is, a predetermined latest IVC corresponding to a maximum working angle). As can be appreciated from the characteristic curves shown in FIG. 8, the correlation between desired intake-air quantity and variable parameter A/NV varies depending on a change in valve timing (in particular, a change in intake valve closure timing IVC). In the system of the embodiment, only the correlation between desired intake-air quantity and variable parameter A/NV, obtained at the latest intake valve closure timing (corresponding to the maximum working angle), is pre-stored in the memory of ECU 15 as the predetermined reference characteristic. As can be seen from the characteristic diagram shown in FIG. 9, in the reference characteristic curve, an air quantity substantially corresponding to a throttle-opening-area indicative variable parameter A/NV corresponding to the aforementioned desired boost is the pre-stored reference air quantity KOUTEN#. On the other hand, the threshold value is a lower limit intake-air quantity obtained at a minimum working angle which is preprogrammed to be suitable for the latest up-to-date engine speed data Ne. Additionally, throttle valve 16 is controlled in such a manner that the boost pressure level is controlled or brought closer to the desired boost (specified boost) within the valve timing control area. That is, the threshold value corresponds to an air quantity which is obtained with a throttle opening area substantially corresponding to the desired-boost-related throttle-opening-area indicative variable parameter A/NV and with the minimum working angle for the latest up-to-date engine speed data Ne detected at the current control cycle. As can be seen from the characteristic curves shown in FIGS. 8 and 9, there is an increased tendency for desired intake-air quantity versus variable parameter A/NV characteristic curves for respective valve timings to be similar to each other. Thus, by utilizing the pre-stored sole reference characteristic, within desired intake-air quantity similarity-extension section 105, a similarity-extension process is made to the desired intake-air quantity calculated through intake-air quantity calculation section 101, so that the desired intake-air quantity is similarity-extended or transformed into a value corresponding to the reference characteristic by multiplying a ratio (reference air quantity KOUTEN#/threshold value) of the pre-stored reference air quantity KOUTEN# to the threshold value by the desired intake-air quantity. That is to say, the above-mentioned similarity-extension process for the desired intake-air quantity means that a desired intake-air quantity similarity-transformation point lying on a characteristic curve corresponding to a minimum working angle (an intake valve closure timing) corresponding to engine speed Ne sensed at the current control cycle is similarity-transformed into the corresponding position on the pre-stored reference characteristic curve corresponding to the maximum working angle. Thereafter, on the basis of the similarity-extended desired intake-air quantity, a similarity-extension A/NV calculation section 106 arithmetically calculates or determines the variable parameter A/NV corresponding to the similarity-extended desired intake-air quantity, utilizing the above-mentioned pre-stored reference characteristic. An A/NV similarity-contraction section 107 serves to transform or similarity-contract the variable parameter A/NV output from similarity-extension A/NV calculation section 106 into a variable parameter A/NV (second parameter A/NV) corresponding to the desired intake-air quantity similarity-transformation point on the characteristic curve corresponding to the minimum working angle suitable for engine speed Ne sensed at the current control cycle. Actually, the similarity-contraction processing is achieved by dividing the similarity-extended variable parameter A/NV by the ratio of the pre-stored reference air quantity KOUTEN# to the threshold value. In this manner, through blocks 105–107, the second parameter A/NV that produces the desired intake-air quantity at a minimum working angle (an intake valve closure timing) which is preprogrammed to be suitable for engine speed Ne, is easily estimated on the basis of the desired intake-air quantity calculated by block 101, the reference air quantity KOUTEN#, and the threshold limit value, from the sole predetermined reference characteristic. In the system of the embodiment, only the sole predetermined reference characteristic is pre-stored and the second parameter A/NV is arithmetically calculated simply by a series of similarity-transformations (detailed later), utilizing the reference characteristic. Thus, there is no necessity for a plurality of desired intake-air quantity versus variable parameter A/NV characteristic curves to be memorized for every valve timing. This ensures a reduced memory capacity of the memory (ROM, RAM) of ECU 15. Then, the first parameter A/NV which is calculated by desired-boost-related parameter A/NV calculation section 104 in order to attain or realize the desired boost (specified boost), and the second parameter A/NV which is calculated through a series of similarity-transformations (blocks 105–107) in order to attain or realize the desired intake-air quantity, are both input into a select-low section 108. Select-low section 108 selects a lower one of the first and second parameters, and then generates an output signal indicative of the selected variable parameter A/NV. After this, a desired throttle opening area A is calculated by multiplying the selected variable parameter A/NV by both the current value of engine speed Ne and the displacement V of the engine. Select-low section 108 outputs a control signal corresponding to the desired throttle opening area A via the output interface of ECU 15 to throttle actuator 17. Throttle actuator 17 drives throttle valve 16 in response to the control signal, so that the actual throttle opening is brought closer to the desired throttle opening.

As will be appreciated from the above, when the first parameter A/NV calculated by desired-boost-related parameter A/NV calculation section 104 is below the second parameter A/NV calculated by A/NV similarity-contraction section 107, select-low section 108 selects the first parameter A/NV. In other words, the system selects the parameter A/NV of the previously-noted valve timing control area (see the upper unhatched area of FIG. 6). In the case that the first parameter A/NV (the valve timing control area) is selected, a final variable parameter A/NV is adjusted to and held at a value corresponding to the desired boost (specified boost), so that the boost pressure level is controlled or regulated closer to the desired boost by driving throttle valve 16 by means of throttle actuator (motor) 17. At this time, the actual intake-air quantity is controlled closer to the desired intake-air quantity by changing the intake valve timing (in particular, the intake valve closure timing) responsively to a change in the desired intake-air quantity (see the characteristic curve shown in FIG. 5). Conversely, when the second parameter A/NV calculated by a series of similarity-transformations (blocks 105–107) is below the first parameter A/NV calculated by desired-boost-related parameter A/NV calculation section 104, select-low section 108 selects the second parameter A/NV. In other words, the system selects the variable parameter A/NV of the previously-noted throttle control area (see the lower hatched area of FIG. 6). Thus, in the presence of transition from the valve timing control area to the throttle control area, the variable parameter A/NV which has been adjusted to and kept at a value corresponding to the desired boost (specified boost) theretofore, can be smoothly decreasingly controlled or compensated for, responsively to a decrease in the desired intake-air quantity (see the smooth transition from a point, lying on the straight characteristic line indicated by the solid line in FIG. 9 related to the straight first parameter A/NV characteristic line of FIG. 7, to a point, lying on the second parameter A/NV characteristic curve indicated by the solid line in FIG. 9. That is, within the throttle control area, the intake-air quantity of engine 1 can be reliably controlled closer to the desired intake-air quantity by the aid of the throttle opening control of throttle valve 16. As can be appreciated from the above, according to the control apparatus of the embodiment, the target value of the variable parameter A/NV continually smoothly changes from the first parameter A/NV of the valve timing control area to the second parameter A/NV of the throttle control area. By virtue of the select-low processing executed by select-low section 108, it is possible to perform a smooth transition between the first operating range (the valve timing control area) and the second operating range (the throttle control area) in a state of the same controlled intake-air quantity. Thus, the control apparatus of the embodiment ensures smooth switching between the valve timing control area and the throttle control area without any torque difference.

As discussed above, the minimum working angle of intake valve 3 tends to become larger with an increase in engine speed Ne. Therefore, a second parameter A/NV control characteristic of the throttle control area, in which the second parameter A/NV is below the first parameter A/NV corresponding to the desired boost and thus the actual intake-air quantity is controlled closer to the desired value on the basis of the second parameter A/NV, also varies depending on the minimum working angle based on engine speed Ne (see the Ne-IVC characteristic of FIG. 9 regarded as the engine-speed versus minimum working angle characteristic).

Figure 10:
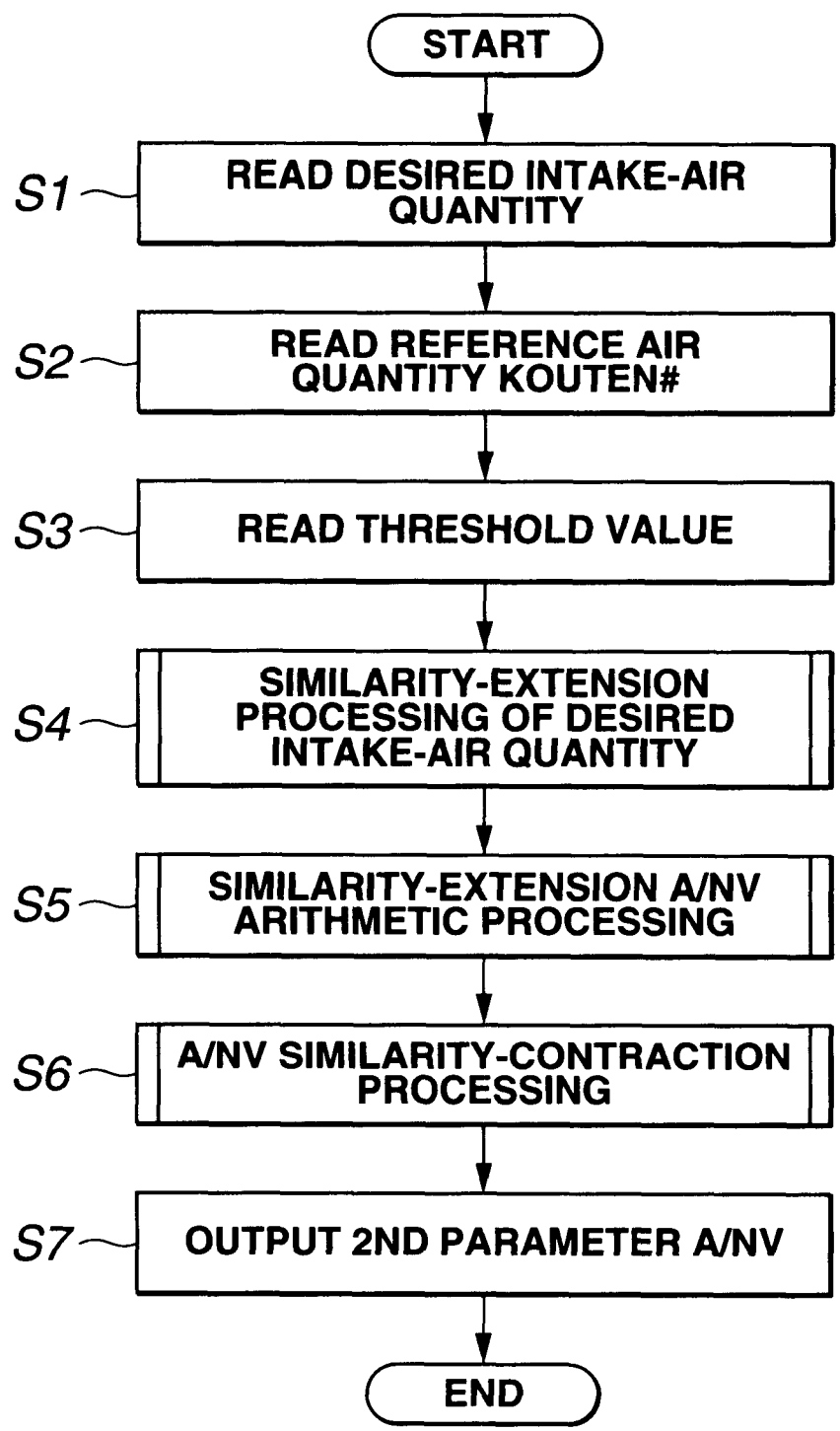
FIG. 10 is a flow chart illustrating a preprogrammed variable parameter A/NV arithmetic processing used to calculate a throttle-opening-area indicative variable parameter A/NV (second parameter A/NV) of a throttle control area.

Referring to FIG. 10, there is shown the second parameter A/NV arithmetic-calculation routine which is related to three blocks 105, 106, and 107 of the block diagram of FIG. 3 and needed to compute the second parameter A/NV used within the throttle control area.

At step S1, the desired intake-air quantity, which is calculated by desired intake-air quantity calculation section 101, is read. At the same time, the pre-stored reference air quantity KOUTEN# is read at step S2 and the threshold value (lower limit intake-air quantity), which is calculated by threshold calculation section 102, is read at step S3. Then, at step S4, the previously-noted-similarity-extension processing is made to the desired intake-air quantity, so that the desired intake-air quantity is similarity-transformed into a value lying on the reference characteristic curve on the basis of both the reference air quantity KOUTEN# and the threshold value (see block 105 of FIG. 3). After this, at step S5, the variable parameter A/NV needed to obtain the desired intake-air quantity is calculated on the basis of the similarity-extended desired intake-air quantity computed at step S4, making reference to the preprogrammed reference characteristic curve (see block 106 of FIG. 3). Thereafter, at step S6, a similarity-contraction processing is made to the similarity-transformed A/NV value lying on the reference characteristic curve, so that the similarity-transformed A/NV value on the reference characteristic curve is further similarity-transformed into the previously-noted second parameter A/NV so as to produce the desired intake-air quantity at the minimum working angle (at the actual valve timing in the throttle control area) (see block 107 of FIG. 3). At step S7, the second parameter A/NV is output from A/NV similarity-contraction section 107 to select-low section 108. In this manner, one cycle of the sub-routine for the second parameter A/NV terminates.

Figure 11:
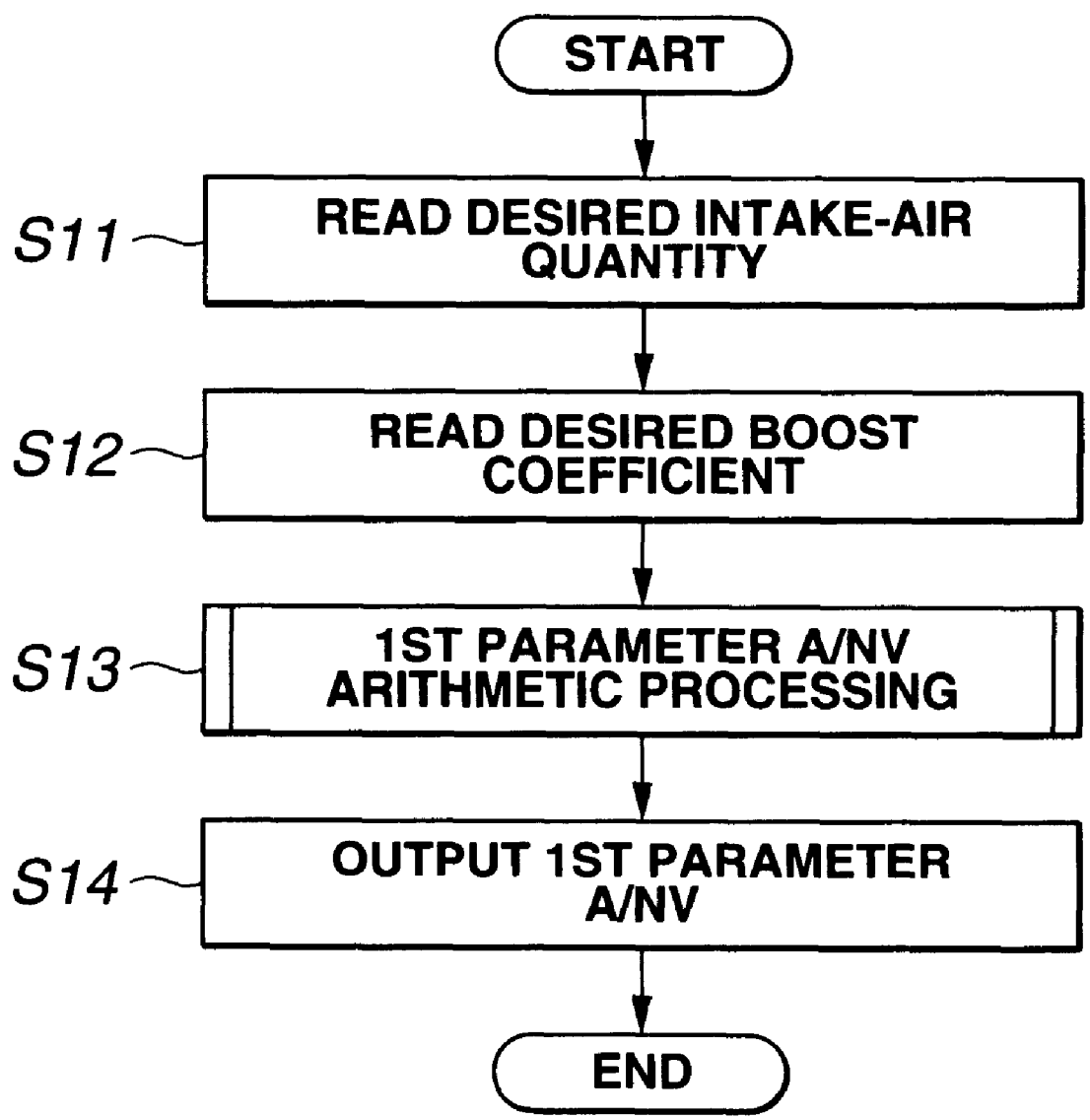
FIG. 11 is a flow chart illustrating a preprogrammed variable parameter A/NV arithmetic processing used to calculate a throttle-opening-area indicative variable parameter A/NV (first parameter A/NV) of a valve timing control area, and needed to attain a desired boost.

Referring to FIG. 11, there is shown the first parameter A/NV arithmetic-calculation routine which is related to desired-boost-related parameter A/NV calculation section 104 of the block diagram of FIG. 3 and needed to compute the first parameter A/NV used within the valve timing control area so that the boost pressure level is controlled to and held at the desired boost.

At step S11, the desired intake-air quantity, which is calculated by desired intake-air quantity calculation section 101, is read. At step S12, a predetermined coefficient which is based on the desired boost (specified boost), is read. The coefficient based on the desired boost will be referred to as a desired-boost coefficient which corresponds to the gradient of the straight line shown in FIG. 7. Then, at step S13, the first parameter A/NV that realizes the desired boost is computed or retrieved on the basis of both the desired intake-air quantity and the desired-boost coefficient. In the shown embodiment, the first parameter A/NV is computed as a product of the desired intake-air quantity and the desired-boost coefficient. After this, at step S14, the first parameter A/NV is output from desired-boost-related parameter A/NV calculation section 104 to select-low section 108.

Figure 12:
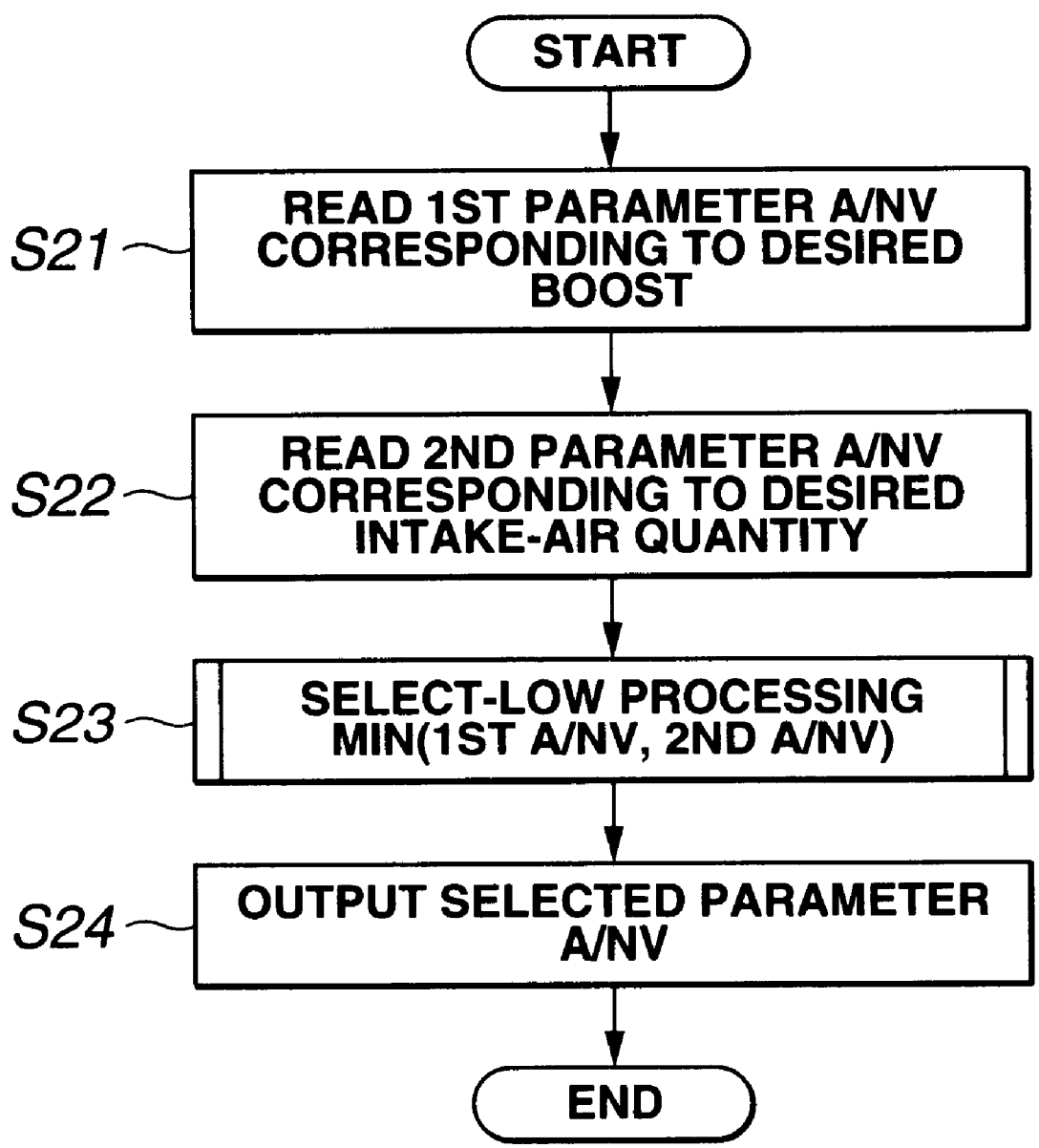
FIG. 12 is a flow chart illustrating a select-low process between the first parameter A/NV obtained through block 104 and the second parameter A/NV obtained through blocks 105–107.

Referring to FIG. 12, there is shown the final parameter A/NV selection routine which is related to select-low section 108 of the block diagram of FIG. 3 and needed to compute the final parameter A/NV.

First, the first parameter A/NV needed to control the boost pressure level to the desired boost (specified boost) is read at step S21 (see step S14 of FIG. 11 and the signal line from block 104 to block 108 in FIG. 3), while the second parameter A/NV needed to produce the desired intake-air quantity is read at step S22 (see step S7 of FIG. 10 and the signal line from block 107 to block 108 in FIG. 3). At step S23, by way of the select-low processing of select-low section 108, a lower one of the first parameter A/NV and the second parameter A/NV is selected. Then, at step S24, a control signal indicative of the selected parameter A/NV, that is, the final parameter A/NV is sent out to throttle actuator 17 to drive throttle valve 16 such that the actual throttle opening is adjusted to the desired value corresponding to the selected parameter A/NV.

Figure 7:
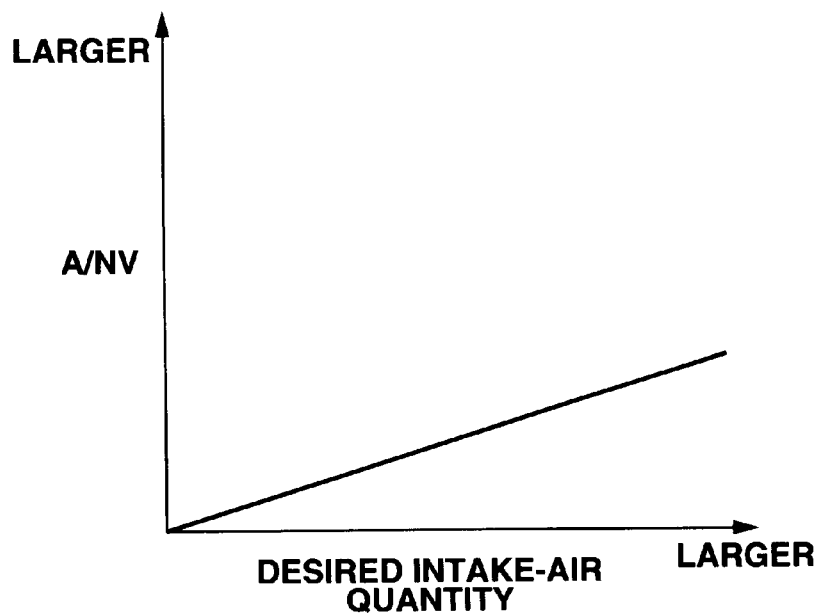
FIG. 7 is a predetermined lookup table showing the relationship of desired intake-air quantity versus throttle-opening-area indicative variable parameter A/NV (=A/(Ne·V)).

According to the intake-air control apparatus of the embodiment, in the valve timing control area, that is, during IVC advancement Miller-cycle operating mode, the intake valve closure timing IVC is controlled responsively to the desired intake-air quantity (see the characteristic shown in FIG. 5) so that the intake-air quantity of the engine is brought closer to the desired intake-air quantity by way of the valve timing control of the intake valve, and additionally the throttle opening of the throttle valve is decreasingly compensated for with a decrease in the desired intake-air quantity so as to attain the desired boost (see the monotone-increasing characteristic shown in FIG. 7). To the contrary, in the throttle control area, that is, when the desired intake-air-quantity is less than an intake-air quantity obtained at a minimum working angle which is preprogrammed to be suitable for the current engine speed (the latest up-to-date engine speed data), the intake valve closure timing IVC is controlled or adjusted toward the valve timing corresponding to the minimum working angle and additionally the throttle opening is decreasingly compensated for with a decrease in the desired intake-air quantity in accordance with the characteristic curve of FIG. 9 different from the monotone-increasing characteristic of FIG. 7, so that the intake-air quantity, which is obtainable at the minimum working angle suitable for the current engine speed, can be decreasingly compensated for by the throttle opening control (the boost control) by reducing the throttle opening area to below the throttle opening area corresponding to the desired boost. In the presence of transition from the valve timing control area to the throttle control area, the throttle opening can be smoothly changed from the first parameter A/NV to the second parameter A/NV (see the smooth transition from the a point, lying on the straight characteristic line indicated by the solid line in FIG. 9 and related to the straight first parameter A/NV characteristic line of FIG. 7, to a point, lying on the second parameter A/NV characteristic curve indicated by the solid line in FIG. 9. Note that, as can be seen from FIG. 9, during the transition from the valve timing control area to the throttle control area, the parameter A/NV related to the throttle opening area is smoothly shifted from the point lying on the straight solid line of FIG. 9 to the point lying on the characteristic curve of FIG. 9 and preprogrammed or set at a lower level than the point lying on the straight solid line (the monotonic-function characteristic line of FIG. 7). As can be seen from FIG. 9, the predetermined characteristic curve varies in close proximity to the monotonic-function characteristic line of FIG. 7, in the throttle control area. In the shown embodiment, the smooth shifting from the first parameter A/NV to the second parameter A/NV is achieved by the previously-discussed select-low process. That is, when the desired intake-air quantity becomes less than a lower limit of intake-air quantity (threshold limit value) which can be attained by valve timing control in a specified state in which the throttle opening is controlled in such a manner as to attain the desired boost (specified boost), there is a necessity for the throttle opening area to be reduced to a level (second parameter A/NV) less than the throttle opening area (first parameter A/NV) that realizes the desired boost. At this time, the second parameter A/NV, which is determined based on the valve timing and the desired intake-air quantity, is selected.

Figure 13:
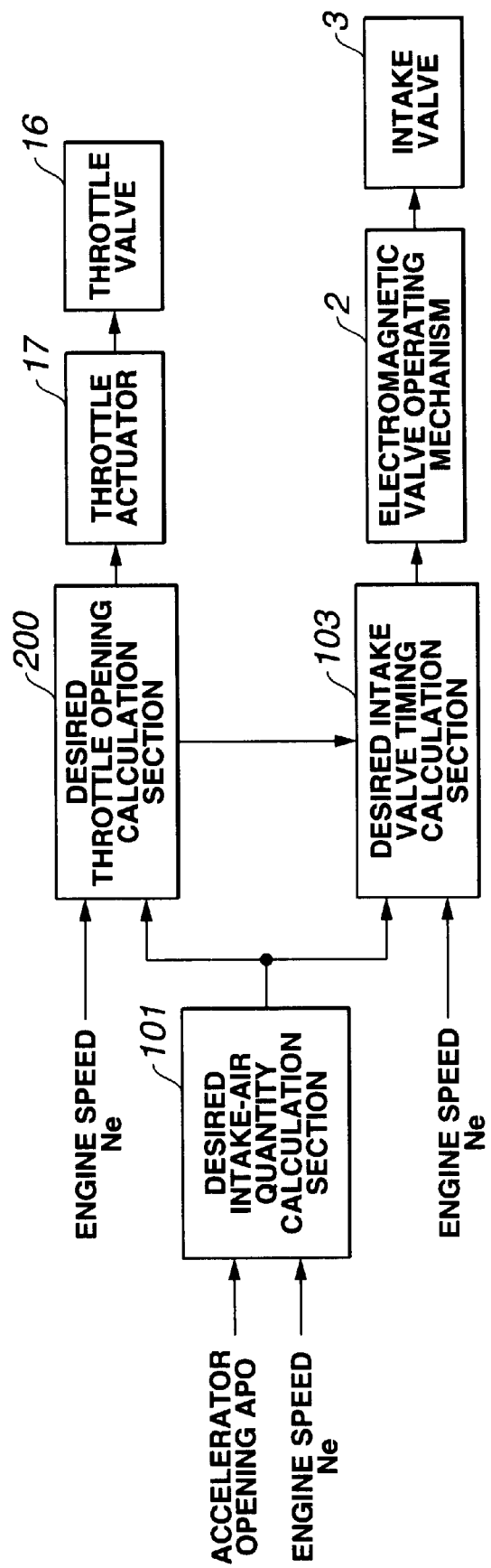
FIG. 13 is a detailed block diagram of another embodiment of the intake-air quantity control apparatus of the invention.

Referring now to FIG. 13, there is shown another intake-air quantity control system block diagram illustrating arithmetic and logical operations performed within the ECU of the intake-air quantity control apparatus of the second embodiment. The intake-air quantity control apparatus of the second embodiment (shown in FIGS. 13 and 14) is slightly different from that of the first embodiment (FIGS. 3–12), in that, in the control apparatus of FIGS. 13 and 14, the throttle opening of throttle valve 16 is fixed to a predetermined value substantially corresponding to a substantially full-open position in the previously-discussed valve timing control area, that is, during the IVC advancement Miller-cycle operating mode, and as a whole the control system of the second embodiment is somewhat simple in structure.

Figure 5:
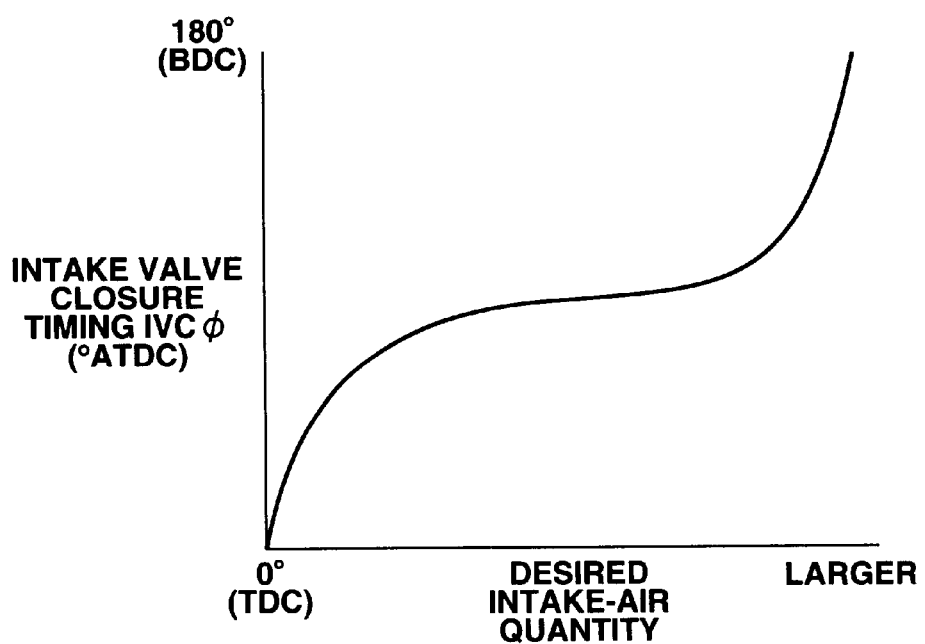
FIG. 5 is a predetermined characteristic map showing the relationship of desired intake-air quantity versus intake-valve closure timing (IVC) stored in the control apparatus of the embodiments of FIGS. 3 and 13.

Briefly speaking, in case of the system of the second embodiment, within the valve timing control area (see the unhatched area of FIG. 6), that is, during the IVC advancement Miller-cycle operating mode, throttle valve 16 is held at a substantially full-open state by means of the throttle actuator, while the intake-valve closure timing IVC of intake valve 3 is variably controlled responsively to a change in the desired intake-air quantity (see the characteristic curve of FIG. 5). On the contrary, within the previously-discussed throttle control area (see the hatched area of FIG. 6) in which the actual intake-air quantity cannot be controlled closer to the desired value by way of only the valve timing control (in particular, IVC control), intake valve 3 is held at a state wherein the intake valve can be driven at a substantially minimum working angle suitable for engine speed Ne (see FIG. 15), while the throttle opening of throttle valve 16 is variably controlled responsively to the desired intake-air quantity (see FIG. 9).

As can be seen from the control system block diagram of FIG. 13, the intake-air control apparatus of the second embodiment performs the cooperative control of the valve timing control of intake valve 3 and the throttle opening control of throttle valve 16. The arithmetic and logical operation sections of the control apparatus of the second embodiment of FIG. 13 is similar to those of the first embodiment, except that blocks 102 and 104–108 included in the block diagram shown in FIG. 3 are replaced with block 200 included in the block diagram shown in FIG. 13. Thus, the same block numbers used to designate blocks in the diagram shown in FIG. 3 will be applied to the corresponding block numbers used in the modified control system block diagram shown in FIG. 13, for the purpose of comparison of the two different system block diagrams. Block 200 will be hereinafter described in detail with reference to the accompanying drawings, while detailed description of the other blocks 101 and 103 will be omitted because the above description thereon seems to be self-explanatory.

First, the desired intake-air quantity calculation section (block 101) calculates a desired intake-air quantity based on accelerator opening APO and engine speed Ne. Then, informational data indicative of the desired intake-air quantity calculated by block 101 is sent out to a desired throttle opening calculation section 200 as well as desired intake valve timing calculation section 103. Desired throttle opening calculation section 200 also receives informational signal data indicative of engine speed Ne. Within desired throttle opening calculation section 200, the previously-described threshold value (corresponding to an air quantity on the borderline between the valve timing control area and the throttle control area) is retrieved from the preprogrammed map data shown in FIG. 6. The threshold value calculated within desired throttle opening calculation section 200 is output to the input terminal of desired intake valve timing calculation section 103. In the same manner as desired intake valve timing calculation section 103, desired throttle opening calculation section 200 also compares the threshold value with the desired intake-air quantity to determine whether the current operating range is within the valve timing control area or within the throttle control area. When the desired intake-air quantity is above the threshold value and thus the current operating range is within the valve timing control area, the desired throttle opening is fixed to a predetermined value substantially corresponding to a substantially full-open position of throttle valve 16. Conversely, when the desired intake-air quantity is below the threshold value and thus the current operating range is within the throttle control area, desired throttle opening calculation section 200 functions to calculate or retrieve a desired opening area (needed to attain the desired intake-air quantity) on the basis of the desired intake-air quantity as well as engine speed Ne, and then to convert the desired opening area into a desired throttle opening of throttle valve 16. Thereafter, the output interface (drive circuit) of ECU 15 outputs a control signal (or a drive signal) representative of the desired throttle opening to throttle actuator (motor) 17 to drive the throttle valve so that the actual throttle opening is brought closer to the desired throttle opening. As can be seen from the flow from block 103 via electromagnetic valve operating mechanism 2 to intake valve 3 in FIGS. 3 and 13, details of intake-valve timing control executed by the control system of the second embodiment are identical to the first embodiment.

Figure 14:
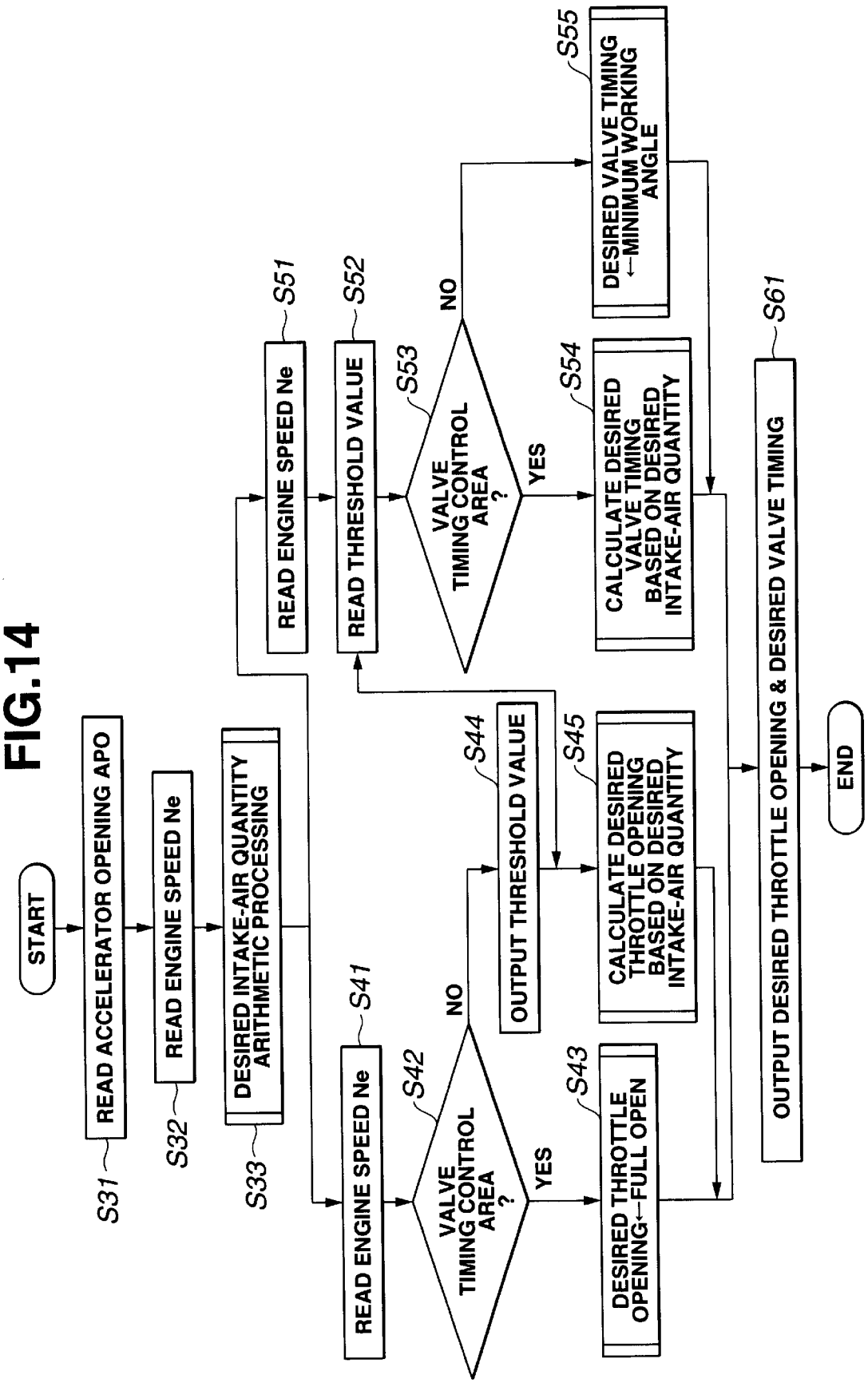
FIG. 14 is a flow chart illustrating details of the intake-air quantity control executed by the control apparatus of FIG. 13.

Referring to FIG. 14, there is shown the control routine of intake-air control performed by the system of the second embodiment.

At step S31, accelerator opening APO is read. At step S32, engine speed Ne is read. At step S33, the desired intake-air quantity is calculated based on both accelerator opening APO and engine speed Ne. After this, a desired throttle opening arithmetic processing comprised of steps S41–S45 and related to block 200 of FIG. 13, and a desired valve timing arithmetic processing comprised of steps S51–S55 and related to block 103 of FIG. 13, are executed in parallel with each other.

At step S41, engine speed Ne is read again. At step S42, a test is made to determine on the basis of both the desired intake-air quantity and engine speed Ne, as to whether the current operating range is within the valve timing control area or within the throttle control area. For this test of step S42, the desired intake-air quantity is compared to the threshold value based on engine speed Ne (see FIG. 6). When the desired intake-air quantity is above the threshold value and thus the current operating range is within the valve timing control area, the routine proceeds from step S42 to step S43. At step S43, a desired throttle opening suitable for the valve timing control area (i.e., the IVC advancement Miller-cycle operating mode) is computed. Concretely, the desired throttle opening is set or fixed to a predetermined value substantially corresponding to a substantially full-open position. Conversely, when the desired intake-air quantity is below the threshold value and thus the current operating range is within the throttle control area, the routine proceeds from step S42 to step S44. At step S44, information signal data indicative of the threshold value lying on the borderline between the valve timing control area and the throttle control area, is output to desired intake valve timing calculation section 103. Thereafter, at step S45, first, the desired opening area is calculated based on both the desired intake-air quantity and engine speed Ne, and then a desired throttle opening is further derived or calculated based on the desired opening area calculated.

On the other hand, in the desired valve timing arithmetic processing executed parallel to the desired throttle opening arithmetic processing, first, at step S51, engine speed Ne is read. As appreciated from the flow from step S44 to step S52, the threshold value is read at step S52. Thereafter, in the same manner as step S42, the desired intake-air quantity is compared to the threshold value through step S53 to determine whether the current operating range is within the valve timing control area or within the throttle control area. When the answer to step S53 is affirmative (YES) and thus the current operating range is within the valve timing control area, the routine proceeds from step S53 to step S54. At step S54, the desired valve timing (in particular, the desired intake valve closure timing) of intake valve 3 is calculated depending on the desired intake-air quantity (seethe desired intake-air quantity versus IVC characteristic map FIG. 5). Conversely, when the answer to step S53 is negative (NO), step S55 occurs. At step S55, in order to drive the intake valve at the specified operating time (substantially corresponding to the minimum working angle or the minimum operating time), the desired intake valve closure timing corresponding to the specified minimum operating time is calculated on the basis of the current data of engine speed Ne (see FIG. 15). Then, at step S61, a control signal corresponding to the desired throttle opening and a control signal corresponding to the desired intake valve closure timing are respectively output to throttle actuator 17 and electromagnetic valve operating mechanism 2.

According to the intake-air quantity control apparatus of the embodiments shown in FIG. 3 and 13, an intake-air quantity of the engine can be reliably controlled or brought closer to a desired value by way of the cooperative control of valve timing control (IVC control) and throttle opening control, and thus it is possible to achieve the accurate intake-air quantity control in an engine operating range in which the intake-air quantity cannot be brought closer to the desired value by only the valve timing control. As a result, it is possible to control the intake-air quantity over a very wide engine operating range. Further, in the control apparatus of the second embodiment shown in FIGS. 13 and 14, in the valve timing control area, that is, during the IVC advancement Miller-cycle operating mode, the throttle valve is fixed to a substantially full-open state, and additionally the intake-air quantity can be brought closer to the desired value by the IVC control. This remarkably reduces a pumping loss of the engine. Moreover, as can be seen from the engine Ne versus intake valve closure timing IVC characteristic of FIG. 15, even in presence of a change in minimum working angle of the intake valve owing to a change in engine speed Ne, the lower limit intake-air quantity (threshold limit value) can be determined with accuracy. This ensures accurate determination of the threshold limit value (the borderline between the valve timing control area and throttle control area) for each engine speed.

In the previously-discussed embodiments, the borderline (corresponding to the threshold limit value) between the valve timing control area and the throttle control area is set to the lower limit intake-air quantity obtained at the minimum working angle corresponding to the minimum operating time. In lieu thereof, the borderline (threshold value) may be set at a level somewhat higher than the lower limit intake-air quantity obtained at the minimum working angle. This enhances the reliability of intake-air quantity control within both the valve timing control area as well as the throttle control area. Furthermore, from the view point of reduced pumping loss, it is preferable to preprogram or set the throttle control area at as narrow an operating range as possible in which the actual intake-air quantity cannot be controlled to the desired intake-air quantity by way of only the valve timing control (in particular, IVC control). However, the throttle control area may be set in such a manner to contain at least an operating range in which the actual intake-air quantity cannot be controlled to the desired intake-air quantity by way of only the valve timing control (in particular, IVC control). For instance, the throttle control area may be further enlarged leftwards (viewing FIG. 6) in a manner so as to contain a low-speed, low-load operating range as well as a high-speed, low-load operating range (the hatched area of FIG. 6).

The entire contents of Japanese Patent Application Nos. P11-346133 (filed Dec. 6, 1999) and P11-345373 (filed Dec. 3, 1999) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An intake-air quantity control apparatus for an internal combustion engine comprising:

a variable valve timing system associated with at least an intake valve;

a throttle valve located upstream of the intake valve;

a throttle actuator variably adjusting a throttle opening of the throttle valve;

sensors detecting engine operating conditions; and a control unit configured to be connected electrically to the sensors, the variable valve timing system, and the throttle actuator, for automatically controlling an intake-air quantity of air entering the engine depending on the engine operating conditions; said control unit comprising a data processing section programmed to perform the following, calculating a desired intake-air quantity based on the engine operating conditions;

calculating a first intake valve timing corresponding to the desired intake-air quantity;

determining, responsively to the engine operating conditions, whether the desired intake-air quantity is below a threshold limit value that corresponds to a lower limit intake-air quantity above which valve timing control of the intake valve enables the intake-air quantity of the engine to be brought closer to the desired intake-air quantity;

calculating a second intake valve timing substantially corresponding to the threshold limit value;

setting a desired valve timing of the intake valve to the second intake valve timing when the desired intake-air quantity is below the threshold limit value; and calculating a desired throttle opening that realizes the desired intake-air quantity by throttle opening control of the throttle valve when the desired intake-air quantity is below the threshold limit value.

2. The intake-air quantity control apparatus as claimed in claim 1, wherein, when the desired intake-air quantity is below the threshold limit value, the second intake valve timing is set at a timing substantially corresponding to a minimum working angle and the intake-air quantity is brought closer to the desired intake-air quantity by varying the desired throttle opening that realizes the desired intake-air quantity, responsively to the desired intake-air quantity.

3. The intake-air quantity control apparatus as claimed in claim 1, wherein, when the desired intake-air quantity is above the threshold limit value, the desired throttle opening is fixed to a predetermined value substantially corresponding to a substantially full-open position of the throttle valve and the intake-air quantity is brought closer to the desired intake-air quantity by varying the first valve timing responsively to the desired intake-air quantity.

4. The intake-air quantity control apparatus as claimed in claim 1, wherein the sensors detect at least engine speed as the engine operating conditions, and the threshold limit value varies depending on the engine speed, and the data processing section determines, responsively to the engine speed, whether the desired intake-air quantity is below the threshold limit value.

5. The intake-air quantity control apparatus as claimed in claim 4, wherein the threshold limit value increases with an increase in the engine speed, so that an area that is less than the threshold limit value of the valve timing control of the intake valve enlarges with the increase in the engine speed.

6. The intake-air quantity control apparatus as claimed in claim 1, wherein the sensors detect at least engine speed as the engine operating conditions, and when the desired intake-air quantity is below the threshold limit value, the data processing section sets the second intake valve timing at a timing substantially corresponding to a minimum working angle based on the engine speed.

7. The intake-air quantity control apparatus as claimed in claim 1, wherein the sensors detect at least engine speed as the engine operating conditions, and when the desired intake-air quantity is below the threshold limit value the data processing section sets the second intake valve timing at an intake valve closure timing substantially corresponding to a minimum working angle based on the engine speed, and fixes an intake valve open timing to a timing substantially corresponding to a substantially top dead center during exhaust stroke.

8. The intake-air quantity control apparatus as claimed in claim 1, wherein the variable valve timing system comprises an electromagnetic valve operating mechanism operatively connected to the intake valve, the electromagnetic valve operating mechanism comprising a non-magnetic housing installed on a cylinder head of the engine, an armature integrally connected to a stem of the intake valve so that the armature is movable within the housing, a pair of electromagnetic coils respectively facing opposed surfaces of the armature, the pair of electromagnetic coils respectively attracting the armature when the pair of electromagnetic coils are energized, and a pair of return springs biasing the intake valve respectively in a direction opening and closing of the intake valve.

9. The intake-air quantity control apparatus as claimed in claim 1, wherein the data processing section calculates a desired throttle opening that realizes a desired boost on the basis of the desired intake-air quantity, and when the desired intake-air quantity is above the threshold limit value, a throttle opening of the throttle valve is brought closer to the desired throttle opening that realizes the desired boost and the intake-air quantity is brought closer to the desired intake-air quantity by varying the first valve timing responsively to the desired intake-air quantity.

10. The intake-air quantity control apparatus as claimed in claim 1, wherein the desired throttle opening that realizes the desired intake-air quantity is smaller than the desired throttle opening that realizes the desired boost.

11. An intake-air quantity control apparatus for an internal combustion engine comprising:

a variable valve timing system associated with at least an intake valve;

a throttle valve located upstream of the intake valve;

a throttle actuator variably adjusting a throttle opening of the throttle valve;

sensors detecting engine operating conditions; and a control unit configured to be connected electrically to the sensors, the variable valve timing system, and the throttle actuator, for automatically controlling an intake-air quantity of air entering the engine depending on the engine operating conditions; said control unit calculating a desired intake-air quantity based on the engine operating conditions, and performing a first operating mode when the desired intake-air quantity is above a threshold limit value that corresponds to a lower limit intake-air quantity above which valve timing control of the intake valve enables the intake-air quantity of the engine to be brought closer to the desired intake-air quantity, and performing a second operating mode when the desired intake-air quantity is below the threshold limit value, the first operating mode in which the intake-air quantity of the engine is brought closer to the desired intake-air quantity by the valve timing control of the intake valve and a throttle opening area of the throttle valve decreases with a decrease in the desired intake-air quantity to realize a desired boost, and the second operating mode in which the intake-air quantity is brought closer to the desired intake-air quantity by reducing the throttle opening area of the throttle valve to below the throttle opening area of the first operating mode that realizes the desired boost.

12. The intake-air quantity control apparatus as claimed in claim 11, wherein the control unit calculates a first throttle opening area of the first operating mode that realizes the desired boost and calculates a second throttle opening area of the second operating mode that realizes the desired intake-air quantity, and selects a lower one of the first and second throttle opening areas, so that the throttle valve is driven by the throttle actuator responsively to the lower throttle opening area.

13. The intake-air quantity control apparatus as claimed in claim 12, wherein the sensors detect at least engine speed as the engine operating conditions, and the control unit pre-stores a predetermined reference characteristic of a throttle opening area that produces the desired intake-air quantity at a reference valve timing of the intake valve, and estimates the second throttle opening area that produces the desired intake-air quantity at an intake valve timing which is pre-programmed to be suitable for the engine speed, from the predetermined reference characteristic.

14. The intake-air quantity control apparatus as claimed in claim 13, wherein the control unit calculates a ratio of a reference air quantity on the predetermined reference characteristic to the threshold limit value, and similarity-transforms the desired intake-air quantity into a similarity-extended desired intake-air quantity by multiplying the ratio of the reference air quantity to the threshold limit value by the desired intake-air quantity, and retrieves a similarity-extended throttle opening area based on the similarity-extended desired intake-air quantity from the predetermined reference characteristic, and similarity-contracts the similarity-extended throttle opening area into the second throttle opening area by dividing the similarity-extended throttle opening area by the ratio of the reference air quantity to the threshold limit value by the desired intake-air quantity, the reference air quantity on the predetermined reference characteristic being an air quantity substantially corresponding to a throttle opening area corresponding to the desired boost.

15. The intake-air quantity control apparatus as claimed in claim 14, wherein, when the desired intake-air quantity is below the threshold limit value, a desired intake valve timing is set at a timing substantially corresponding to a minimum working angle and the intake-air quantity is brought closer to the desired intake-air quantity by varying a desired throttle opening that realizes the desired intake-air quantity, responsively to the desired intake-air quantity.

16. The intake-air quantity control apparatus as claimed in claim 14, wherein the threshold limit value varies depending on the engine speed, and the control unit determines, responsively to the engine speed, whether the desired intake-air quantity is below the threshold limit value.

17. The intake-air quantity control apparatus as claimed in claim 16, wherein the threshold limit value increases with an increase in the engine speed, so that an area that is less than the threshold limit value of the valve timing control of the intake valve enlarges with the increase in the engine speed.

18. The intake-air quantity control apparatus as claimed in claim 14, wherein, when the desired intake-air quantity is below the threshold limit value, the control unit sets a desired intake valve timing at a timing substantially corresponding to a minimum working angle based on the engine speed.

19. The intake-air quantity control apparatus as claimed in claim 14, wherein, when the desired intake-air quantity is below the threshold limit value, the control unit sets the second intake valve timing at an intake valve closure timing substantially corresponding to a minimum working angle based on the engine speed, and fixes an intake valve open timing to a timing substantially corresponding to a substantially top dead center during exhaust stroke.

20. The intake-air quantity control apparatus as claimed in claim 14, wherein the variable valve timing system comprises an electromagnetic valve operating mechanism operatively connected to the intake valve, the electromagnetic valve operating mechanism comprising a non-magnetic housing installed on a cylinder head of the engine, an armature integrally connected to a stem of the intake valve so that the armature is movable within the housing, a pair of electromagnetic coils respectively facing opposed surfaces of the armature, the pair of electromagnetic coils respectively attracting the armature when the pair of electromagnetic coils are energized, and a pair of return springs biasing the intake valve respectively in a direction opening and closing of the intake valve.

21. An intake-air quantity control apparatus for an internal combustion engine comprising:

a variable valve timing system associated with at least an intake valve;

a throttle valve located upstream of the intake valve;

a throttle actuator variably adjusting a throttle opening of the throttle valve;

sensors detecting engine operating conditions including at least engine speed; and a control unit configured to be connected electrically to the sensors, the variable valve timing system, and the throttle actuator, for automatically controlling an intake-air quantity of air entering the engine depending on the engine operating conditions; said control unit calculating a desired intake-air quantity based on the engine operating conditions, and calculating a threshold limit value that corresponds to a lower limit intake-air quantity above which intake valve closure timing control of the intake valve enables the intake-air quantity of the engine to be brought closer to the desired intake-air quantity, and variably controlling an intake valve closure timing responsively to the desired intake-air quantity so that the intake-air quantity is brought closer to the desired intake-air quantity by the intake valve closure timing control and decreasingly compensating for a desired throttle opening of the throttle valve with a decrease in the desired intake-air quantity in accordance with a first characteristic to attain a desired boost in a first operating range in which the desired intake-air quantity is above the threshold limit value, and variably controlling the intake valve closure timing toward a valve timing corresponding to a minimum working angle which is preprogrammed to be suitable for the engine speed and decreasingly compensating for the desired throttle opening with a decrease in the desired intake-air quantity in accordance with a second characteristic in a second operating range in which the desired intake-air quantity is below the threshold limit value, the first characteristic being a monotonic function according to which the desired throttle opening decreases with a decrease in the desired intake-air quantity, and the second characteristic being a predetermined characteristic curve according to which points lying on the predetermined characteristic curve are lower than points lying on the first characteristic within the second operating range.

22. The intake-air quantity control apparatus as claimed in claim 21, wherein the predetermined characteristic curve varies in close proximity to the monotonic-function characteristic line in the second operating range.

23. An intake-air quantity control apparatus for an internal combustion engine comprising:

a variable valve timing system associated with at least an intake valve;

a throttle valve located upstream of the intake valve;

a throttle actuator variably adjusting a throttle opening of the throttle valve;

sensors detecting engine operating conditions including at least engine speed; and a control unit configured to be connected electrically to the sensors, the variable valve timing system, and the throttle actuator, for automatically controlling an intake-air quantity of air entering the engine depending on the engine operating conditions, and calculating a desired intake-air quantity based on the engine operating conditions and calculating a threshold limit value that corresponds to a lower limit intake-air quantity above which intake valve closure timing control of the intake valve enables the intake-air quantity of the engine to be brought closer to the desired intake-air quantity, the control unit comprising, an intake-valve closure timing control means connected to the variable valve timing control system for variably controlling an intake valve closure timing responsively to the desired intake-air quantity so that the intake-air quantity is brought closer to the desired intake-air quantity by the intake valve closure timing control in a first operating range in which the desired intake-air quantity is above the threshold limit value, and for variably controlling the intake valve closure timing toward a valve timing corresponding to a minimum working angle which is preprogrammed to be suitable for the engine speed in a second operating range in which the desired intake-air quantity is above the threshold limit value; and a throttle control means connected to the throttle actuator for decreasingly compensating for a desired throttle opening of the throttle valve with a decrease in the desired intake-air quantity in accordance with a first characteristic to attain a desired boost in the first operating range, and for decreasingly compensating for the desired throttle opening with a decrease in the desired intake-air quantity in accordance with a second characteristic in the second operating range, the first characteristic being a monotonic function according to which the desired throttle opening decreases with a decrease in the desired intake-air quantity, and the second characteristic being a predetermined characteristic curve according to which points lying on the predetermined characteristic curve are lower than points lying on the first characteristic within the second operating range.

24. An electronic control method for an internal combustion engine comprising a variable valve timing system associated with at least an intake valve, a throttle valve located upstream of the intake valve, a throttle actuator variably adjusting a throttle opening of the throttle valve, and sensors detecting engine operating conditions including at least engine speed, the electronic control method comprising:

calculating a desired intake-air quantity based on the engine operating conditions;

calculating a threshold limit value that corresponds to a lower limit intake-air quantity above which intake valve closure timing control of the intake valve enables an intake-air quantity of air entering the engine to be brought closer to the desired intake-air quantity;

comparing the desired intake-air quantity to the threshold limit value;

retrieving an intake valve closure timing from a first desired intake-air quantity versus intake valve closure timing characteristic according to which the intake-air quantity is brought closer to the desired intake-air quantity by the intake valve closure timing control in a first operating range in which the desired intake-air quantity is above the threshold limit value;

retrieving the intake valve closure timing from a second engine speed versus intake valve closure timing characteristic according to which the intake valve closure timing is set at a valve timing corresponding to a minimum working angle which is preprogrammed to be suitable for the engine speed in a second operating range in which the desired intake-air quantity is below the threshold limit value;

decreasingly compensating for a desired throttle opening of the throttle valve with a decrease in the desired intake-air quantity in accordance with a first desired intake-air quantity versus throttle opening area characteristic to attain a desired boost in the first operating range, the first desired intake-air quantity versus throttle opening area characteristic being a monotonic function according to which the desired throttle opening decreases with a decrease in the desired intake-air quantity; and decreasingly compensating for the desired throttle opening with a decrease in the desired intake-air quantity in accordance with a second desired intake-air quantity versus throttle opening area characteristic in the second operating range, the second characteristic being a predetermined characteristic curve according to which points lying on the predetermined characteristic curve are lower than points lying on the first desired intake-air quantity versus throttle opening area characteristic within the second operating range.

25. The electronic control method as claimed in claim 24, wherein the second engine speed versus intake valve closure timing characteristic is a monotonic function according to which the intake valve closure timing increases with an increase in the engine speed.

* * * * *